(12) United States Patent
Wang et al.

(10) Patent No.: US 10,638,386 B2
(45) Date of Patent: Apr. 28, 2020

(54) ENABLING EFFICIENT HANDLING OF REDUNDANT PACKET COPIES IN A WIRELESS COMMUNICATION SYSTEM

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Luleå (SE); Hans Hannu, Luleå (SE)

(73) Assignee: TELEFONATIEBOLAGET LM ERICSSON (PUBL), Stockholm (SE)

( * ) Notice: Subject to any disclaimer, the term of this patent is extended or adjusted under 35 U.S.C. 154(b) by 68 days.

(21) Appl. No.: 15/552,942

(22) PCT Filed: Jun. 7, 2017

(86) PCT No.: PCT/SE2017/050600
§ 371 (c)(1),
(2) Date: Aug. 23, 2017

(87) PCT Pub. No.: WO2018/084759
PCT Pub. Date: May 11, 2018

(65) Prior Publication Data
US 2018/0270718 A1  Sep. 20, 2018

Related U.S. Application Data

(60) Provisional application No. 62/417,429, filed on Nov. 4, 2016.

(51) Int. Cl.
*H04W 36/02* (2009.01)
*H04W 28/06* (2009.01)
(Continued)

(52) U.S. Cl.
CPC ............ *H04W 36/023* (2013.01); *H04L 1/08* (2013.01); *H04L 47/34* (2013.01);
(Continued)

(58) Field of Classification Search
CPC ... H04W 36/023; H04W 36/02; H04W 36/18; H04W 36/0022; H04W 28/065;
(Continued)

(56) References Cited

U.S. PATENT DOCUMENTS

2012/0140689 A1  6/2012  Pelletier et al.
2014/0189470 A1  7/2014  Hwang et al.
(Continued)

FOREIGN PATENT DOCUMENTS

EP   09020230 A1   6/1999
WO   2006089456 A1   8/2006
(Continued)

OTHER PUBLICATIONS

"Repetition/TTI Length Switching Design Issues", 3GPP TSG-RAN WG1 Meeting #56bis, R1-091555, XP050339112, Nokia Siemens Networks, Nokia, Seoul, Korea, Mar. 23-27, 2009, pp. 1-4.
(Continued)

*Primary Examiner* — Jae Y Lee
(74) *Attorney, Agent, or Firm* — Murphy, Bilak & Homiller, PLLC

(57) ABSTRACT

There is provided a method of operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the
(Continued)

second connection. The method comprises the first network unit receiving information from the third network unit indicating packets received by the third network unit from the first network unit over the first connection, and transmitting an indication to the second network unit enabling removal of packets from one or more transmission buffers of the second network unit corresponding to the indicated packets received by the third network unit from the first network unit over the first connection.

10 Claims, 23 Drawing Sheets

(51) Int. Cl.
*H04W 36/00* (2009.01)
*H04L 12/801* (2013.01)
*H04L 1/08* (2006.01)
*H04W 92/20* (2009.01)
*H04W 36/18* (2009.01)
*H04J 11/00* (2006.01)
*H04L 1/00* (2006.01)
*H04L 1/18* (2006.01)

(52) U.S. Cl.
CPC ..... *H04W 28/065* (2013.01); *H04W 36/0022* (2013.01); *H04W 36/0069* (2018.08); *H04J 11/0053* (2013.01); *H04L 1/1874* (2013.01); *H04L 2001/0093* (2013.01); *H04W 36/18* (2013.01); *H04W 92/20* (2013.01)

(58) Field of Classification Search
CPC . H04W 92/20; H04L 1/08; H04L 1/00; H04L 47/34; H04J 11/0053
See application file for complete search history.

(56) References Cited

U.S. PATENT DOCUMENTS

| | | | |
|---|---|---|---|
| 2015/0326456 A1* | 11/2015 | Dudda | H04L 43/062 370/252 |
| 2016/0150586 A1* | 5/2016 | Lei | H04W 36/30 370/332 |
| 2016/0164793 A1* | 6/2016 | Basu Mallick | H04W 28/06 370/235 |
| 2016/0302198 A1 | 10/2016 | Lee et al. | |
| 2017/0164252 A1 | 6/2017 | Chaudhuri et al. | |
| 2017/0171771 A1* | 6/2017 | Jung | H04W 24/10 |
| 2017/0347063 A1 | 11/2017 | Singh et al. | |
| 2018/0227219 A1* | 8/2018 | Zhang | H04W 28/0273 |

FOREIGN PATENT DOCUMENTS

| | | |
|---|---|---|
| WO | 2015026272 A1 | 2/2015 |
| WO | 2017207052 A1 | 12/2017 |

OTHER PUBLICATIONS

Cena, Gianluca et al., "An Enhanced MAC to Increase Reliability in Redundant Wi-Fi Networks", 2014 10th IEEE Workshop on Factory Communication Systems (WFCS 2014), IEEE, XP032608485, May 5, 2014, pp. 1-10.

Unknown, Author, "Draft Report of 3GPP TSG RAN WG6 Meeting #1", held in Gothenburg, Sweden, R6-160212, ETSI MCC, Reno, USA, Aug. 22-26, 2016, 57 pages.

Unknown, Author, "Energy Efficient Hybrid TA/OTD Multilateration for Neighbour Cells in Extended Coverage", 3GPP TSG RAN WG6 Meeting #1, R6-160035, Nokia, Gothenburg, Sweden, Aug. 22-26, 2016, 11 pages.

Unknown, Author, "Multilateration Signaling for GERAN", RAN WG6 Meeting #1, R6-160018, LM Ericsson, Gothenburg, Sweden, Aug. 22-16, 2016, 11 pages.

Unknown, Author, "Dual Connectivity based link switch between LTE and NR", 3GPP TSG-RAN WG2 #95, Tdoc R2-165330, Gothenburg, Sweden, Aug. 22-26, 2016, 1-3.

Unknown, Author, "Response to LS on uplink transmission gap in NB-IoT", 3GPP TSG RAN WG2 Meeting #94, R4-164459, Nanjing, China, May 23-27, 2016, 1-1.

Unknown, Author, "Tight integration of NR and LTE: User Plane design", 3GPP TSG-RAN WG2 #94, Tdoc R2-164027, Nanjing, P.R. China, May 23-27, 2016, 1-4.

Unknown, Author, "UP aspects of Upper layer aggregation (DC like) for multi-connectivity", 3GPP TSG-RAN WG2 #96, Tdoc R2-168670, Reno, Nevada, Nov. 14-18, 2016, 1-4.

* cited by examiner a) the UE receives from the MeNB RLC packets 1 and 3 c) The UE (PDCP entity) informs the SeNB that it has received packets 1 and 3 via a MAC control element.

b) The MeNB uses New Signalling messages towards the SeNB d) Buffer status after our solution

ENABLING EFFICIENT HANDLING OF REDUNDANT PACKET COPIES IN A WIRELESS COMMUNICATION SYSTEM

TECHNICAL FIELD

The proposed technology generally relates to wireless communication systems, e.g. operating based on multi/dual connectivity, and more specifically to methods of operating at least one network unit in a wireless communication system, and corresponding network units, computer programs and computer-program products as well as corresponding apparatuses, an overall method of operating network units in a wireless communication system and a method of operating a network device in a wireless communication system and a corresponding network device, computer program and computer-program product as well as a corresponding apparatus.

BACKGROUND

New evolved wireless communication systems are constantly being developed. By way of example, so-called fifth generation, 5G, systems are currently being discussed, developed and/or deployed. 5G, also referred to as New Radio, NR, is currently viewed primarily as a change to the radio specifications, although other aspects may be concerned.

5G, as an illustrative example, is expected to operate in a wide range of frequency bands, probably using also very high frequency bands compared to 4G. This implies, for example, lower diffraction and higher outdoor-to-indoor penetration losses, which means that signals will have more difficulties to propagate around corners and penetrate walls. Also, the initial deployment of 5G will be rather spotty.

The state-of-the-art integration between two different Radio Access Technologies, RATs, is normally based on so-called hard handover. The major drawbacks with inter-RAT hard handover, e.g. between 3G and 4G, are the rather long delay and service interruption as well as the low reliability. A tighter integration with evolved LTE may therefore be crucial in order to ensure ultra-high reliability and extreme bit rates in a 5G system. This may also hold true for other RATs.

A plausible alternative is to use a solution based on Multi Connectivity, MC, or Dual Connectivity, DC. In general, MC, of which DC is a special case, implies the possibility of multiple (dual) connections that are maintained in parallel. Usually, but not limited thereto, the parallel connections are based on different RATs. It is also possible to provide Multi Connectivity based on one and the same RAT.

FIG. 1 is a schematic diagram illustrating an example of the general principles of Multi/Dual Connectivity in a wireless communication system. In this example, the wireless communication system comprises a first network unit and a second network unit that are both connected to a third network unit using a first connection, between the first network unit and the third network unit, and using a second connection, between the second network unit and the third network unit. Additional connections to the third network unit from further network units (not explicitly shown in FIG. 1) may be provided.

FIG. 2 is a schematic diagram illustrating an example of a Multi/Dual Connectivity system based on two or more radio units being simultaneously connected to a wireless device. The radio units may be connected to or at least partly implemented in a central unit.

For example, in 5G DC, both User Plane, UP, and Control Plane, CP, are normally connected to both LTE and 5G and the UP data is aggregated (or split) at the Packet Data Convergence Protocol, PDCP, layer. Typically, this means that the so-called "bearer split" option (also called 3C) is employed, i.e. the bearer is split in the master eNB at the PDCP layer. Dual connectivity increases the user throughput (due to UP aggregation), especially at low load and increases the reliability (due to CP diversity).

However, MC or DC does not increase the coverage of the user plane data like solutions such as Coordinated Multi Point, CoMP, soft handover and multi-flow. All these solutions transmit the same UP data over all links and thereby increases the coverage. CoMP and Soft handover rely on a synchronized transmission (and reception) and maximum ratio combining (MRC) of the signals (i.e. combing of the symbols). However, for LTE and 5G (NR) this can be very difficult due to different transport formats, pilots, waveforms, numerology etc. Also, both CoMP and soft handover requires very good backhaul (X2) and quite synchronized networks. Therefore, solutions like HSPA multi-flow may be a solution for LTE-5G tight integration, as well as NR-NR multi-connectivity, enabling coverage extension due to selection ratio combing (SRC). This is not as good as CoMP/Soft handover which enables MRC but can still give large benefits especially in situations with very fast and varying channels.

A main problem with Multi Connectivity in general, and LTE-5G dual connectivity in particular, is that it does not by itself increase the coverage of the user plane data. One option is to multiplicate/duplicate the packets, i.e. transmit the same packets over two or more connections, or more generally transmit packets comprising the same information over two or more connections.

By way of example, for LTE-5G, the same PDCP packets may be transmitted in both connections/links/RATs. In HSDPA multi-flow, the Radio Link Control, RLC, packet flow may be split over two links and it is also possible to duplicate the RLC packets over the two links.

A major problem with sending the same PDCP packets from more than one node is that one of the nodes may need much longer time to transmit the PDCP packet than the other nodes(s) due to bad coverage or different link bit-rates. This has the disadvantage that the UE therefore need to wait for the worst node packet transmission before requesting a retransmission. This both creates the need for increased buffer size in the UE, extra packet delays and unnecessary interference. The PDCP receiver entity discards the redundant PDCP PDUs by checking the sequence number at PDCP header. However, this only solves the problem to some extent. This solution still induces extra delay and extra interference.

Another problem with multiplicated/duplicated transmissions is that it may waste resources if one link is slower than the other. If for example NR and LTE are used, then the NR link (when in good coverage) may have a bitrate far exceeding that of LTE. This means that LTE may fall behind and transmit RLC PDUs which were already transmitted by NR several TTIs ago. In this case, the duplicated transmissions will eventually be so late, that they are more or less useless. This problem is illustrated in FIG. 3 where different RLC packets are transmitted in the first TTI and already in the second TTI the slow link is transmitting RLC PDUs which were transmitted by the fast link in the first TTI. If this would be continued for a number of TTIs, it is easy to see that the slower link is useless and that PDCP duplication in similar situations will be very resource consuming with very little benefits.

SUMMARY

It is an object to enable efficient handling of redundant packet copies in a wireless communication system operating based on multi/dual connectivity and/or a system for packet multiplication/duplication.

It is also an object to provide methods of operating at least one network unit in a wireless communication system, and corresponding network units, computer programs and computer-program products as well as corresponding apparatuses.

Yet another an object to provide a method of operating a network device in a wireless communication system and a corresponding network device, computer program and computer-program product as well as a corresponding apparatus.

Yet another object is to provide an overall method of operating network units in a wireless communication system.

These and other objects are met by embodiments of the proposed technology.

According to a first aspect, there is provided a method of operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the method comprises:
    the first network unit receiving information from the third network unit indicating packets received by the third network unit from the first network unit over the first connection; and
    the first network unit transmitting an indication to the second network unit enabling removal of packets from one or more transmission buffers of the second network unit corresponding to the indicated packets received by the third network unit from the first network unit over the first connection.

In a sense, the proposed technology can be regarded as a way of enabling removal of redundant packet copies in a system for packet multiplication/duplication.

According to a second aspect, there is provided a method of operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the method comprises:
    the second network unit receiving an indication enabling removal of packets from one or more transmission buffers of the second network unit corresponding to packets received by the third network unit from the first network unit over the first connection; and
    the second network unit removing the indicated packets from the transmission buffer(s).

According to a third aspect, there is provided a method of operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the method comprises:
    the third network unit receiving packets from the first network unit over the first connection; and
    the third network unit transmitting an indication to the second network unit enabling removal of packets from one or more transmission buffers of the second network corresponding to the packets received from the first network unit over the first connection.

According to a fourth aspect, there is provided a method of operating a network device in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the method comprises:
    the network device receiving information indicating which packets are received by the third network unit from the first network unit over the first connection; and
    the network device transmitting an indication to the second network unit enabling removal of packets from one or more transmission buffers of the second network unit corresponding to the indicated packets received by the third network unit from the first network unit over the first connection.

According to a fifth aspect, there is provided an overall method of operating network units in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the method comprises:
    the third network unit receiving packets from the first network unit over the first connection;
    the third network unit transmitting acknowledgment of the received packets to the first network unit;
    the first network unit removing the acknowledged packets from one or more transmission buffers of the first network unit;
    the first network unit or the third network unit transmitting information to the second network unit enabling removal of packets from one or more transmission buffers of the second network unit corresponding to the packets received by the third network unit from the first network unit over the first connection; and
    the second network unit removing the indicated packets from the transmission buffer(s).

According to a sixth aspect, there is provided a network unit configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the network unit is configured for operation as the first network unit, and the network unit is configured to receive information from the third network unit indicating packets received by the third network unit from the first network unit over the first connection; and wherein the network unit is configured to transmit an indication to the second network unit enabling removal of packets from one or more transmission buffers of the second network unit corresponding to the indicated packets received by the third network unit from the first network unit over the first connection.

According to a seventh aspect, there is provided a network unit configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the network unit is configured for operation as the second network unit and the network unit is configured to receive an indication enabling removal of packets from one or more transmission buffers of the second network unit corresponding to packets received by the third network unit from the first network unit over the first connection; and wherein the network unit is configured to remove the indicated packets from the transmission buffer(s).

According to an eighth aspect, there is provided a network unit configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the network unit is configured for operation as the third network unit and the network unit is configured to receive packets from the first network unit over the first connection; and wherein the network unit is configured to transmit an indication to the second network unit enabling removal of packets from one or more transmission buffers of the second network corresponding to the packets received from the first network unit over the first connection.

According to a ninth aspect, there is provided a network device configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the network device is configured to receive information indicating which packets are received by the third network unit from the first network unit over the first connection; and wherein the network device is configured to transmit an indication to the second network unit enabling removal of packets from one or more transmission buffers of the second network unit corresponding to the indicated packets received by the third network unit from the first network unit over the first connection.

According to a tenth aspect, there is provided a computer program for operating, when executed by a processor, at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the computer program comprises instructions, which when executed by the processor, cause the processor to:

read information received from the third network unit indicating packets received by the third network unit from the first network unit over the first connection; and prepare an indication, for transmission to the second network unit, enabling removal of packets from one or more transmission buffers of the second network unit corresponding to the indicated packets received by the third network unit from the first network unit over the first connection.

According to an eleventh aspect, there is provided a computer program for operating, when executed by a processor, at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the computer program comprises instructions, which when executed by the processor, cause the processor to:

read an indication enabling removal of packets from one or more transmission buffers of the second network unit corresponding to packets received by the third network unit from the first network unit over the first connection; and removing the indicated packets from the transmission buffer(s) of the second network unit.

According to a twelfth aspect, there is provided a computer program for operating, when executed by a processor, at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
  wherein the computer program comprises instructions, which when executed by the processor, cause the processor to:
    be notified of packets received from the first network unit over the first connection; and
    prepare an indication, for transmission to the second network unit, enabling removal of packets from one or more transmission buffers of the second network corresponding to the packets received from the first network unit over the first connection.

According to a thirteenth aspect, there is provided a computer program for operating, when executed by a processor, a network device in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
  wherein the computer program comprises instructions, which when executed by the processor, cause the processor to:
    read information indicating packets that have been received by the third network unit from the first network unit over the first connection; and
    prepare an indication, for transmission to the second network unit, enabling removal of packets from one or more transmission buffers of the second network unit corresponding to the indicated packets received by the third network unit from the first network unit over the first connection.

According to a fourteenth aspect, there is provided a computer program product comprising a computer-readable medium in which a computer program of any of the above aspects is stored.

According to a fifteenth aspect, there is provided an apparatus for operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the apparatus comprises:
  an input module for reading information received from the third network unit indicating packets received by the third network unit from the first network unit over the first connection; and
  a preparation module for preparing an indication, for transmission to the second network unit, enabling removal of packets from one or more transmission buffers of the second network unit corresponding to the indicated packets received by the third network unit from the first network unit over the first connection.

According to a sixteenth aspect, there is provided an apparatus for operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the apparatus comprises:
  an input module for receiving an indication enabling removal of packets from one or more transmission buffers of the second network unit corresponding to packets received by the third network unit from the first network unit over the first connection; and
  a removal module for removing of the indicated packets from the transmission buffer(s) of the second network unit.

According to a seventeenth aspect, there is provided an apparatus for operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the apparatus comprises:
  a storage module for storing a notification of packets received from the first network unit over the first connection; and
  a preparation module for preparing an indication, for transmission to the second network unit, enabling removal of packets from one or more transmission buffers of the second network corresponding to the packets received from the first network unit over the first connection.

According to an eighteenth aspect, there is provided an apparatus for operating a network device in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the apparatus comprises:
  an input module for receiving information indicating packets that have been received by the third network unit from the first network unit over the first connection; and
  a preparation module for preparing an indication, for transmission to the second network unit, enabling removal of packets from one or more transmission buffers of the second network unit corresponding to the indicated packets received by the third network unit from the first network unit over the first connection.

In this way, efficient removal of redundant packet copies is enabled and/or effectuated, resulting in reduced transmissions and/or improved user and system throughput and performance.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

In the following, the general non-limiting term "network unit" may refer to any network unit suitable for operation in connection with a wireless communication system, including but not limited to network devices, network nodes and/or associated wireless communication devices.

As used herein, the term "network device" may refer to any device located in connection with a communication network, including but not limited to devices in access networks, core networks and similar network structures. The term network device may also encompass computer-based network devices such as cloud-based network devices for implementation in cloud-based environments.

As used herein, the non-limiting term "network node" may refer to base stations, access points, radio units, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

For a better understanding of the proposed technology, it may be useful to begin with a brief system overview with reference once again to FIG. 1 and FIG. 2, illustrating some of the general principles of Multi/Dual Connectivity in a wireless communication system.

Figure 1:
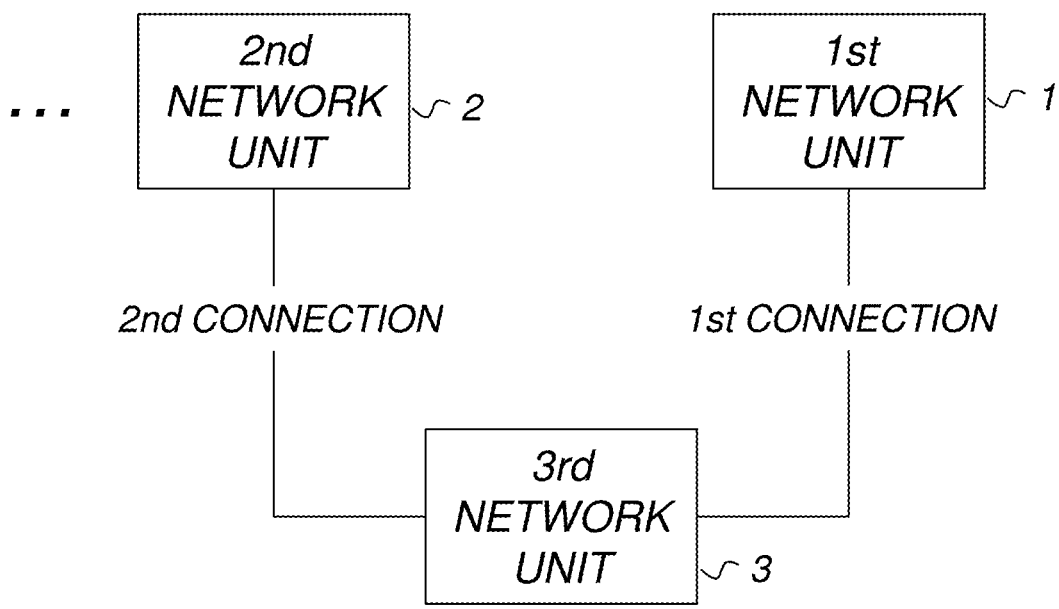
FIG. 1 is a schematic diagram illustrating an example of the general principles of Multi/Dual Connectivity in a wireless communication system.

In the example of FIG. 1, the wireless communication system comprises a first network unit and a second network unit that are both connected to a third network unit using a first connection, between the first network unit and the third network unit, and using a second connection, between the second network unit and the third network unit. As previously mentioned, additional connections to the third network unit from further network units (not explicitly shown in FIG. 1) may be provided.

Figure 2:
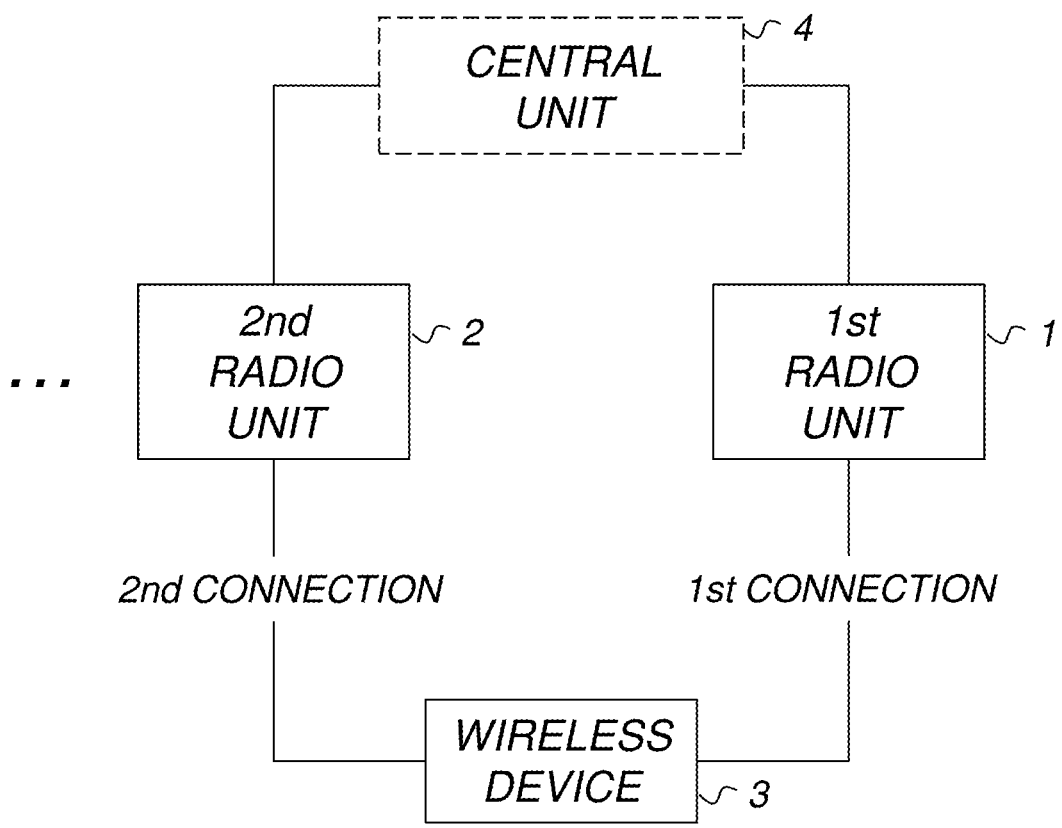
FIG. 2 is a schematic diagram illustrating an example of a Multi/Dual Connectivity system based on two or more radio units being simultaneously connected to a wireless device.
Figure 3:
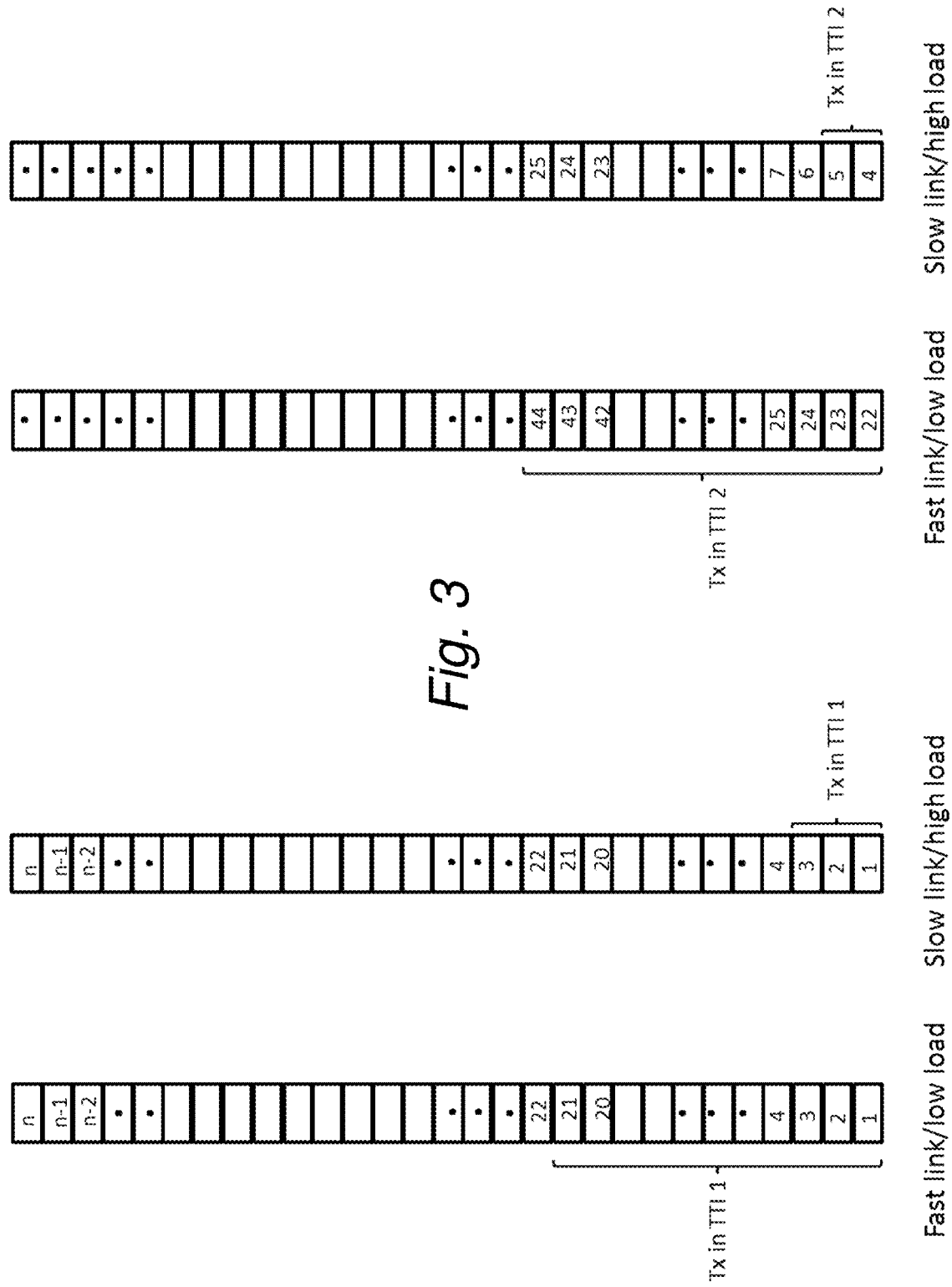
FIG. 3 is a schematic diagram illustrating an example of a situation where different RLC packets are transmitted in a first TTI and already in a second TTI a slow link is transmitting RLC PDUs which were transmitted by a fast link in the first TTI.

Based on a Multi/Dual Connectivity implementation such as that shown in FIG. 1 and/or FIG. 2, packet multiplication/duplication may be provided by transmitting packets comprising the same information over two or more connections. Considering any pair of two connections such as a first connection and a second connection in such a system, packets comprising the same information may thus be transmitted over both the first connection and the second connection.

Accordingly, FIG. 1 provides an illustration of an exemplary environment where the proposed technology may be utilized. Shown is two network units, a first network unit 1 and a second network unit 2, as well as a third network unit 3, which may for example be a wireless device. The network unit 3 is connected to the first network unit 1 and second network unit 2 by means of first and second connections, respectively. The first and second connections may be different, e.g. the first connection may be over a first Radio Access Technology, RAT, such as LTE, while the second connection may be over a second RAT, e.g. 5G connection, sometimes referred to as New Radio, NR. As previously mentioned, the case where a network unit such as a wireless device, e.g. a user equipment, has connections to several other network units is referred to as multi-connectivity and the special case with two connections is referred to as dual connectivity. Descriptions of the requirements for supporting Dual Connectivity in LTE is provided in Ref. 3GPP15-36300 (Technical Specification TS 36.300). The network units participating in MC/DC are often referred to as the master eNB, MeNB, and the secondary eNB, SeNB, although symmetric implementations are also possible.

FIG. 2 is a schematic diagram illustrating an example of a Multi/Dual Connectivity system based on two or more radio units being simultaneously connected to a wireless device. In this example, there is shown a first radio unit 1 and a second radio unit 2 that are connected to a wireless device 3 over a first connection and a second connection, respectively. The radio units may be connected to a central unit 4. In a master-secondary implementation, where one of the radio units may be a master eNB and another radio unit may be a secondary eNB, the master eNB may have a coordinating role for connectivity and/or packet multiplication (duplication). However, it is also possible, e.g. by employing the central unit 4, to provide a solution in which the radio units 1, 2 do not have to be able to coordinate connectivity and/or packet multiplication (duplication) and may therefore be reduced to mere radio units, e.g. radio units that are able to perform the tasks of the layers below the PDCP layer and where the PDCP duplication may instead be provided by the central unit 4. The central unit 4 may thus coordinate duplication of PDCP Packet Data Units, PDCP PDUs, and distribute them among the multiple connections to the wireless device 3.

For a better understanding of the proposed technology, reference will now be made to an overall method of operating network units in a wireless communication system such as that shown in FIG. 1 and/or FIG. 2. For generality, reference will be made to the term "network unit" as a general notation for any suitable network unit that is capable of communicating with one or more other network units in the system.

Figure 4:
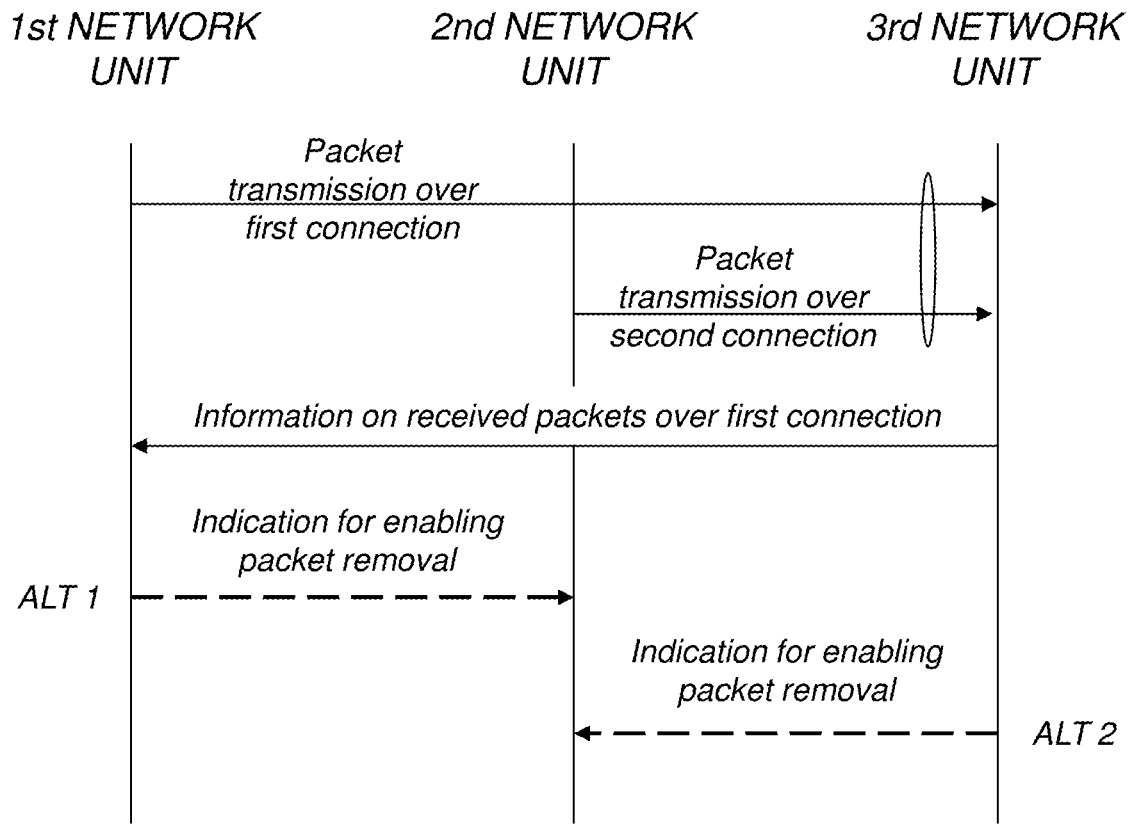
FIG. 4 is a schematic signaling diagram illustrating an example of relevant signaling between network units.

In the following, reference can also be made to the schematic signaling diagram of FIG. 4, which illustrates an example of relevant signaling between the network units.

Basically, the wireless communication system comprises a first network unit 1 and a second network unit 2 that are both connected to a third network unit 3 using a first connection, between the first network unit 1 and the third network unit 3, and using a second connection, between the second network unit 2 and the third network unit 3, wherein packets comprising the same information are transmitted over both the first connection and the second connection.

Basically, this implies that the first network unit 1 performs packet transmission over the first connection, and that the second network unit 2 performs packet transmission over the second connection.

The third network unit 3 (correctly) receives packets from the first network unit over the first connection, and transmits acknowledgment of the received packets to the first network unit 1.

The first network unit 1 may then remove the acknowledged packets from one or more transmission buffers of the first network unit.

According to a first alternative (ALT 1, see FIG. 4), the first network unit 1 transmits information such as an indication to the second network unit 2 enabling removal of packets from one or more transmission buffers of the second network unit corresponding to the packets received by the third network unit 3 from the first network unit 1 over the first connection.

According to another alternative (ALT 2, see FIG. 4), the third network unit 3 transmits information such as an indication to the second network unit 2 enabling removal of packets from one or more transmission buffers of the second network unit corresponding to the packets received by the third network unit 3 from the first network unit 1 over the first connection.

Accordingly, the second network unit may then remove the indicated packets from the transmission buffer(s).

In this way, efficient removal of redundant packet copies is enabled and/or effectuated, resulting in reduced transmissions and/or improved user and system throughput and performance.

The proposed mechanism also avoids that a slower link will fall behind and transmit packets that were already received on the other link.

Accordingly, packet multiplication/duplication can thus be a good alternative to increase coverage and/or reliability.

In other words, at least some aspect(s) of the proposed technology can be seen as a. mechanism to enable efficient handling of redundant packet copies in a wireless communication system operating based on multi/dual connectivity and/or a system for packet multiplication/duplication The proposed technology will now be described with reference to schematic flow diagrams, seen from the perspective of the individual network units, as well as an individual network device, which may be located anywhere in connection with the wireless communication system, including a cloud-based environment.

Figure 5:
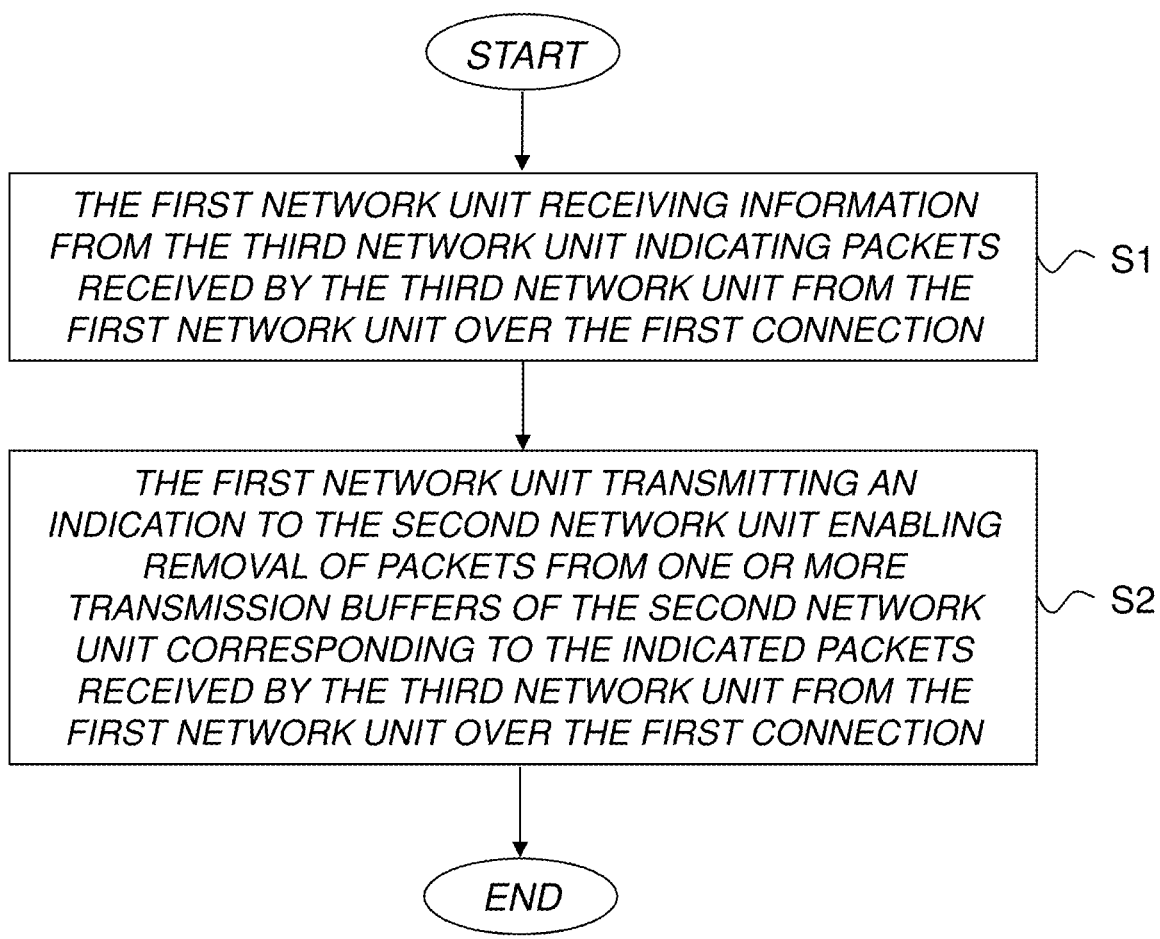
FIG. 5 is a schematic flow diagram illustrating an example of a method of operating at least one network unit in a wireless communication system.

FIG. 5 is a schematic flow diagram illustrating an example of a method of operating at least one network unit in a wireless communication system. The wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection.

The method comprises:

S1: the first network unit receiving information from the third network unit indicating packets received by the third network unit from the first network unit over the first connection; and S2: the first network unit transmitting an indication to the second network unit enabling removal of packets from one or more transmission buffers of the second network unit corresponding to the indicated packets received by the third network unit from the first network unit over the first connection.

For example, the first network unit and the second network unit may be radio network nodes in the wireless communication system and the third network unit may be a wireless device. In a particular example, the first network unit and the second network unit are base stations and the indication enabling removal of packets from one or more transmission buffers of the second network unit corresponding to the indicated packets is transferred from the first network unit to the second network unit using an interface between interconnected base stations.

As an example, the first network unit and the second network unit may be operating in packet multiplication/duplication transmission mode for parallel transmission of packets comprising the same information to the third network unit.

In a sense, the proposed technology can be regarded as a way of enabling removal of redundant packet copies in a system for packet multiplication/duplication.

By way of example, the first network unit informs the second network unit via a message indicating the sequence numbers of acknowledged packets.

Figure 6:
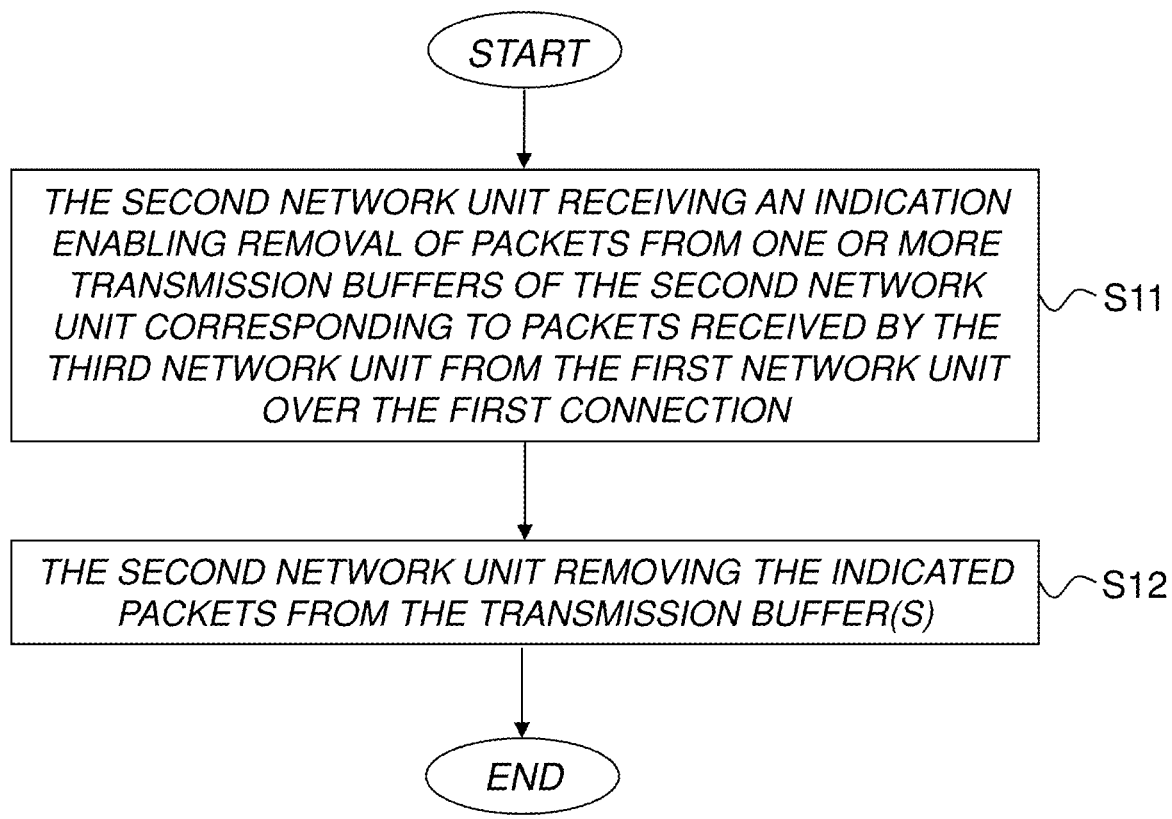
FIG. 6 is a schematic flow diagram illustrating an example of a method of operating at least one network unit in a wireless communication system.

FIG. 6 is a schematic flow diagram illustrating an example of a method of operating at least one network unit in a wireless communication system. The wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection.

The method comprises:

S11: the second network unit receiving an indication enabling removal of packets from one or more transmission buffers of the second network unit corresponding to packets received by the third network unit from the first network unit over the first connection; and S12: the second network unit removing the indicated packets from the transmission buffer(s).

In a first example, the second network unit receives the indication enabling removal of packets from one or more transmission buffers from the first network unit.

For example, the first network unit and the second network unit are base stations and the indication enabling removal of packets from one or more transmission buffers of the second network unit corresponding to the indicated packets is received by the second network unit from the first network unit using an interface between interconnected base stations.

Optionally, the second network unit is informed by the first network unit via a message indicating the sequence numbers of acknowledged packets.

In a second example, the second network unit receives the indication enabling removal of packets from one or more transmission buffers from the third network unit, e.g. over the second connection.

For example, the indication may be received via the uplink of the second connection.

By way of example, the third network unit, such as a wireless device like a UE, receives the packets correctly from first connection and acknowledges the reception via the first connection to first network unit, and the third network unit also notifies the second network unit of the correct reception via the second connection.

In a particular example, the second network unit is informed by the third network unit, using MAC control element signaling, that the third network unit has received the packets correctly.

Optionally, the second network unit transfers information, indicating packets received by the third network unit from the first network unit over the first connection, to the RLC layer and MAC layer to stop transmission of the corresponding data units of the indicated packets and to remove the data units from the buffer(s).

As an example, the second network unit maintains a mapping between higher layer packets and lower layer packets, and the mapping is used by the second network unit for removing packets from the transmission buffer(s). For example, higher layer packet sequence numbers can be used to find the corresponding lower layer packets.

For example, the mapping may be a mapping between PDCP, RLC, and MAC packets. By way of example, the network unit can find the corresponding MAC packets based on PDCP/RLC sequence numbers.

Figure 7:
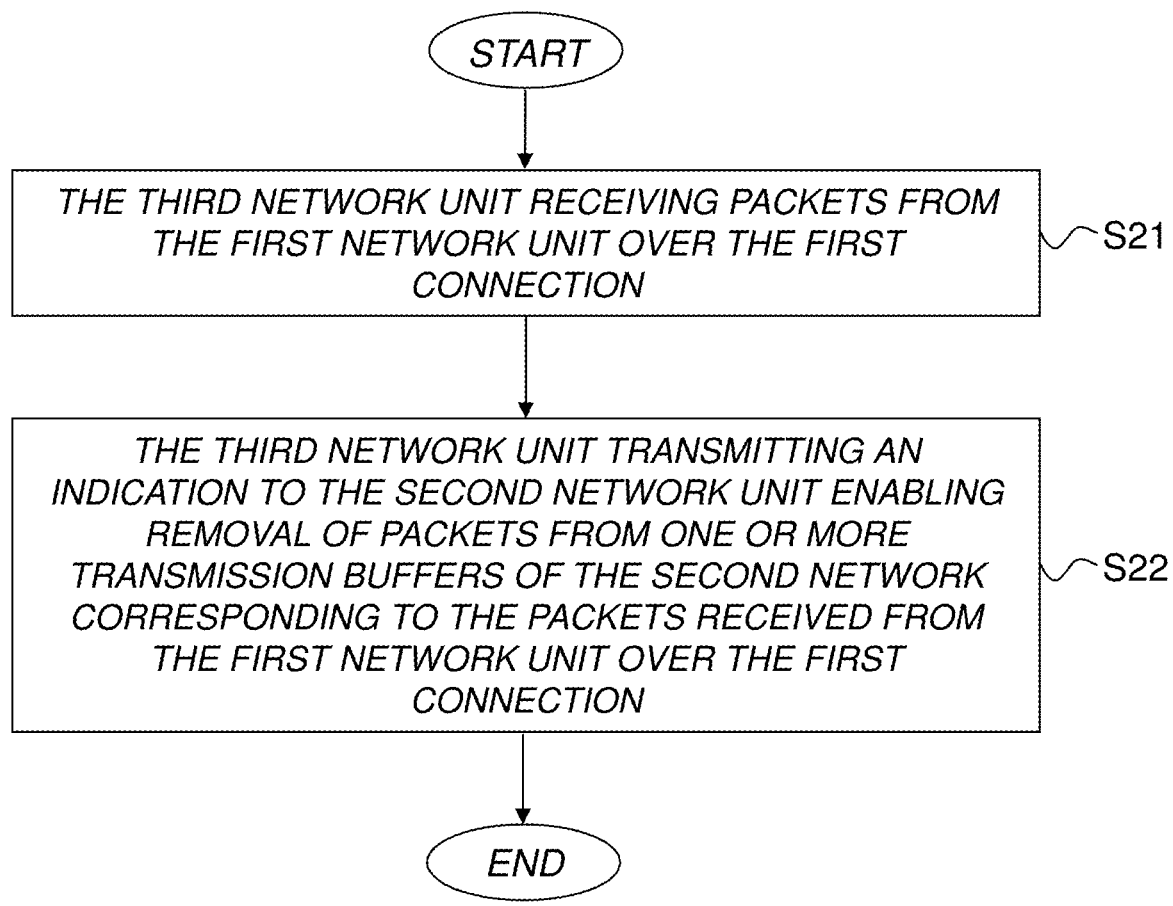
FIG. 7 is a schematic flow diagram illustrating an example of a method of operating at least one network unit in a wireless communication system.

FIG. 7 is a schematic flow diagram illustrating an example of a method of operating at least one network unit in a wireless communication system. The wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection.

The method comprises:

S21: the third network unit receiving packets from the first network unit over the first connection; and S22: the third network unit transmitting an indication to the second network unit enabling removal of packets from one or more transmission buffers of the second network unit corresponding to the packets received from the first network unit over the first connection.

By way of example, the third network unit is a wireless communication device, as defined herein.

In a particular example, the third network unit acknowledges correct reception of the received packets to first network unit, and the third network unit also notifies the second network unit of the correct reception of the received packets.

For example, the indication enabling removal of packets from one or more transmission buffers may be transferred via the uplink of the second connection.

Optionally, the third network unit informs, using MAC control element signaling, the second network unit that the third network unit has received the packets correctly.

Figure 8:
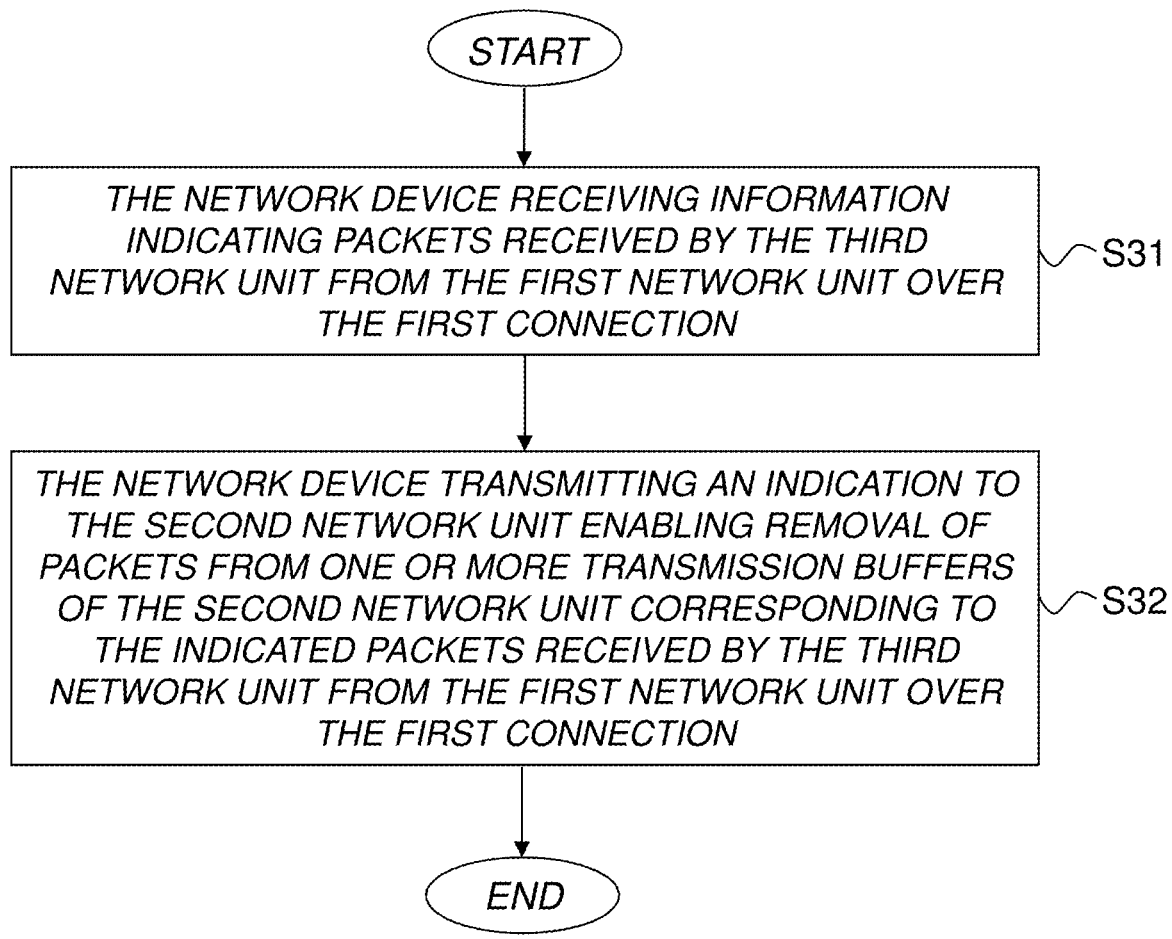
FIG. 8 is a schematic flow diagram illustrating an example of a method of operating a network device in a wireless communication system.

FIG. 8 is a schematic flow diagram illustrating an example of a method of operating a network device in a wireless communication system. The wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection.

The method comprises:

S31: the network device receiving information indicating which packets are received by the third network unit from the first network unit over the first connection; and S32: the network device transmitting an indication to the second network unit enabling removal of packets from one or more transmission buffers of the second network unit corresponding to the indicated packets received by the third network unit from the first network unit over the first connection.

By way of example, the network device may receive, via the first network unit or via the second network unit, the information indicating which packets are received by the third network unit from the first network unit over the first connection.

As an example, the network device may be any device located in connection with a communication network, including but not limited to devices in access networks, core networks and similar network structures. The term network device may also encompass computer-based network devices such as cloud-based network devices for implementation in cloud-based environments.

As an example, the network device may be a central unit for coordinating connectivity and/or packet duplication/multiplication.

In a sense, the proposed technology may be regarded as a solution to provide acknowledgement to the network unit responsible for the second connection if the first connection has already received the packets. This will avoid sending too late packets on the second connection. This will also avoid that the slower second connection falls behind as the packets will be removed from transmission buffers of the second connection and thus keep the benefits with packet multiplication/duplication using multi/dual connectivity.

There are a number of ways of providing the acknowledgement to the network unit responsible for the second connection based on the reception on the first connection. In a first example, the acknowledgement may be transferred using an interface such as the X2 interface between interconnected base stations. In a second example, the acknowledgement may be transferred via the uplink of the second connection. The latter may be faster as it is independent of the speed of the X2 interface.

By way of example, the proposed technology may reduce the overhead from unnecessary transmission on the second connection in the packet duplication scenario of dual connectivity.

The solution may also improve the user and system throughput in the packet duplication scenario of dual connectivity.

Briefly, the solution may thus improve the system and user performance in terms of throughput and/or latency in the packet multiplication/duplication scenario of multi/dual connectivity.

Figure 23:
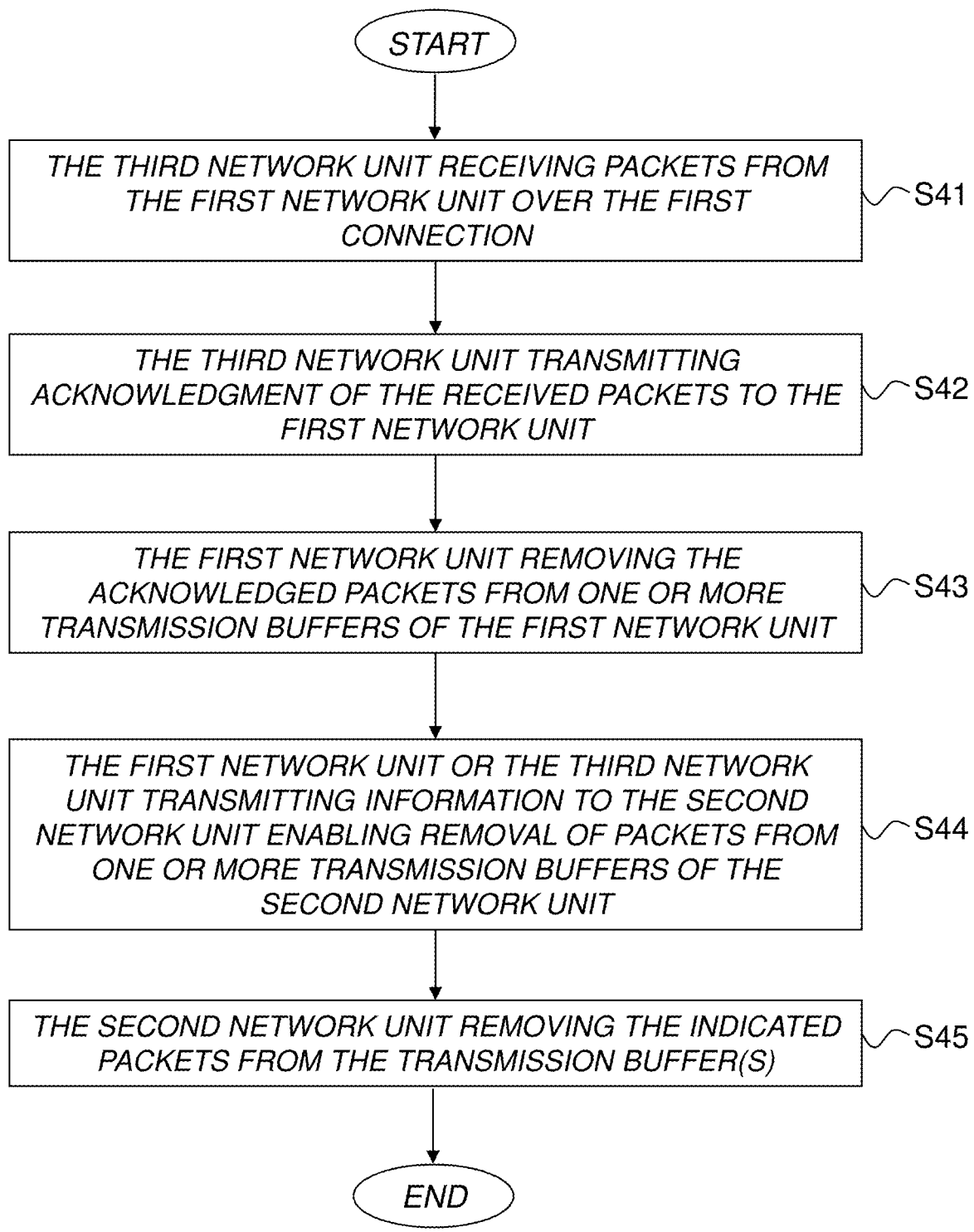
FIG. 23 is a schematic flow diagram illustrating an example of a method of operating network units in a wireless communication system.

FIG. 23 is a schematic flow diagram illustrating an example of a method of operating network units in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection.

The method illustrated in FIG. 23 comprises:

S41: the third network unit receiving packets from the first network unit over the first connection;

S42: the third network unit transmitting acknowledgment of the received packets to the first network unit;

S43: the first network unit removing the acknowledged packets from one or more transmission buffers of the first network unit;

S44: the first network unit or the third network unit transmitting information to the second network unit enabling removal of packets from one or more transmission buffers of the second network unit corresponding to the packets received by the third network unit from the first network unit over the first connection; and S45: the second network unit removing the indicated packets from the transmission buffer(s).

For all embodiments, the following features may be applicable, if desirable:

By way of example, the wireless communication system may be operating based on multi/dual connectivity for enabling packet multiplication/duplication.

For example, the first network unit and the second network unit may be radio network nodes in the wireless communication system and the third network unit may be a wireless device.

Optionally, the first network unit and the second network unit are master and secondary networks units configured for dual connectivity and packet duplication, and the third network unit is a wireless device.

As an example, the first connection is over a first Radio Access Technology, RAT and the second connection is over a second different RAT.

In a particular example, the same transport block size is used on both the first connection and the second connection.

In the following, various non-limiting examples will be outlined and discussed.

In an example embodiment, a first network node and a second network node are both connected to a third node such as a wireless device using a first connection, from the first network node to the third node, and using a second connection, from the second network node the third node, where packets containing the same information are sent on both connections.

In a first method, the third node receives packets correctly on the first connection from the first network node, the third node acknowledges the packets on the first connection back to the first network node, the first network node removes the corresponding packets from its transmission buffers and informs the second network node that the third node has received the packets correctly, the second network node removes the corresponding packets from its transmission buffers. Both the first and second network nodes may continue with transmission of other duplicated packets.

In a second method, the third node receives packets correctly on the first connection from the first network node, the third node acknowledges the packets on the first connection back to the first network node, the third node informs the second network node that the third node has received the packets correctly (the third node acknowledges the packets on the second connection to the second network node), the first network node and second network node remove the corresponding packets from its transmission buffers. Both the first and second network nodes may continue with transmission of other duplicated packets.

By way of example, an embodiment may be related to packet duplication in dual connectivity as defined in 3GPP. Preferably, the first network node is a MeNB or a SeNB and/or the second network node is a SeNB or a MeNB. For example, the third node may be a wireless device such as a UE.

In the first method, the first network node may inform the second network node, e.g. via X2 signaling protocol using a message indicating the sequence numbers of the acknowledged packets, where the acknowledged packets are PDCP packets.

In the first method, the first and second network nodes may keep a mapping between higher layer packet sequence numbers and lower layer packets.

In the first method, the mapping may be used to be able to remove packets from the first and second network nodes transmission buffers.

In the second method, the third node may inform the second network node that the third node has received the packets correctly (the third node acknowledges the packets on the second connection to the second network node), e.g. using MAC control element signaling messages.

By way of example, the signaling may be sent over a radio signal interface.

In the second method, the first and second network nodes may keep a mapping between higher layer packet sequence numbers and lower layer packets.

In the second method, the mapping may be used to be able to remove packets from the first and second network nodes transmission buffers.

However, to simplify the implementation another enhancement may be to reduce the possible transport block sizes to be used at the two connections. In its simplest form this solution enhancement would be to use the same transport block size on both connections allowing for simple and known mapping between transport blocks up to the PDCP packets. Another incentive for doing the transport block size is that duplication is likely to be used in difficult coverage situations or extreme reliability, hence, getting some throughput is better than a high throughput.

In yet another embodiment the transport packets over the first and second connections are limited in number of allowed sizes.

A benefit is that the third network unit such as a UE) knows that it has received a full "PDCP" packet already when a successful MAC PDU is received, and not only a small part of the PDCP packet.

Figure 9:
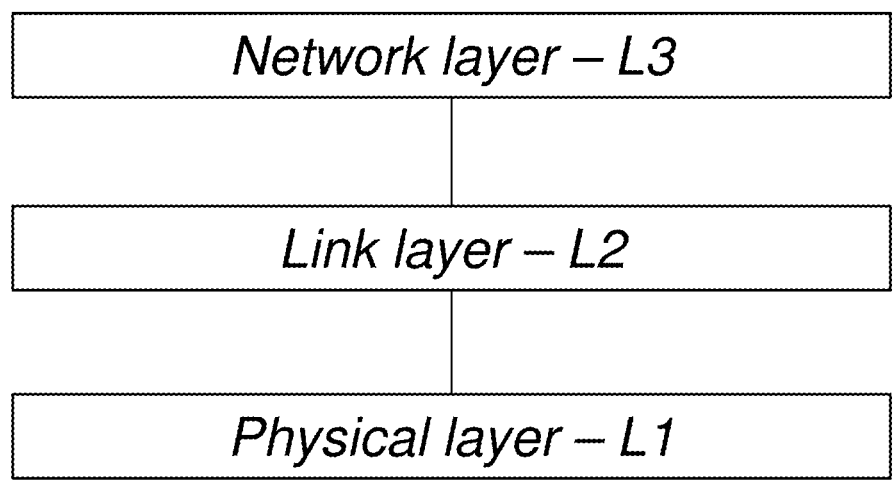
FIG. 9 is a schematic diagram illustrating an example of a protocol stack of a wireless communication system divided into three different layers: the physical layer, the link layer, and the network layer.
Figure 10:
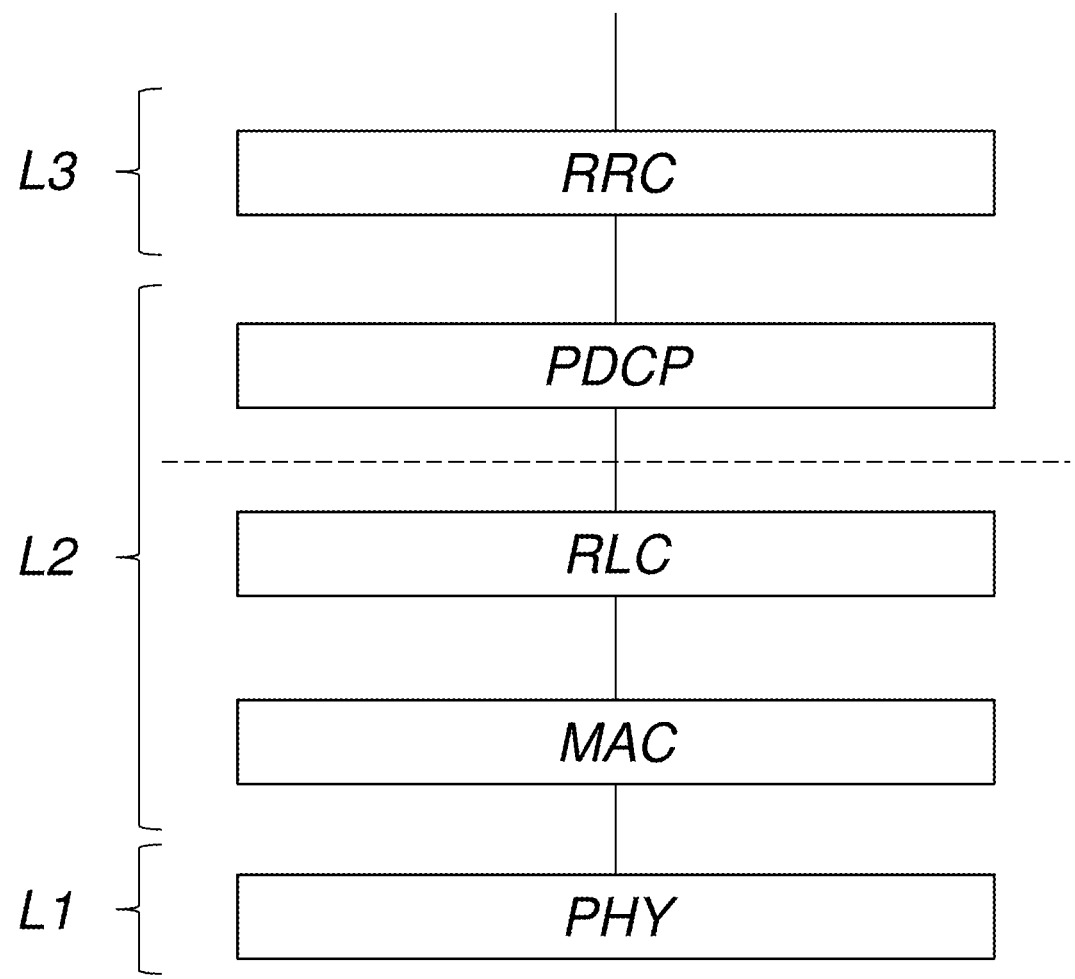
FIG. 10 is a schematic diagram illustrating a particular example of three protocol layers, including sub-layers, of a protocol stack suitable for a wireless communication system.

For a better understanding of the proposed technology, a brief overview of a few non-limiting examples of the protocol stack of a wireless communication system can be made with reference to FIG. 9 and FIG. 10.

According to well-accepted technology, a simple way to illustrate a protocol stack of a wireless communication system is to divide the stack into three different layers: the physical layer, the link layer, and the network layer, as schematically shown in FIG. 9. The physical layer is sometimes referred to as layer 1, L1. The link layer is sometimes referred to as layer 2, L2. The network layer is sometimes referred to as layer 3, L3.

FIG. 10 is a schematic diagram illustrating a particular example of three protocol layers, including sub-layers, of a protocol stack suitable for a wireless communication system such as LTE, NR and the like.

The protocol stack is typically implemented for some form of underlying network unit or device including radio circuitry coupled to one or more antennas and/or circuits for communication with other similar network units such as network nodes, end user equipment and/or other network devices.

The lowest layer, L1, is the Physical Layer, PHY, followed by layer 2, L2, which includes the Medium Access Control, MAC, layer, the Radio Link Control, RLC layer, and the Packet Data Convergence Control, PDCP, layer. Layer 3, L3, includes the Radio Resource Control, RRC, layer and optionally also other sub-layers.

L1 handles uplink and downlink in the Physical Layer, Layer 1 of the protocol stack. In uplink, L1 may for example process antenna data received from the radio circuitry, which processing may include removing cyclic prefix, running Fast Fourier Transform, FFT, to extract sub-channels, decoding/demodulating symbols, extracting physical channels and passing user information up to the MAC layer of L2. In downlink, L1 may for example take user data provided by the MAC lower of L2. Examples of tasks that may be performed by L1 in downlink may include constructing physical channels, performing turbo coding, scrambling, modulating, layer mapping, pre-coding, frequency mapping, inverse FFT, and cyclic prefix insertion and sending antenna data to the radio circuitry. To handle this processing, specialized hardware may be used, including accelerators, to form processing chains.

L2 typically includes a synchronous part and an asynchronous part. The synchronous part of L2 normally includes the MAC and RLC sub-layers. The asynchronous part of L2 normally includes the PDCP sub-layer.

The MAC sub-layer may have a separate entity for each connected UE, and a few additional entities for common needs such as system information, paging, and random access response. The RLC sub-layer may have a separate entity for each logical channel, corresponding to radio bearers. Downlink and uplink may operate independently of each other, with some signaling forwarded from the uplink to the downlink. Downlink: A task of synchronous L2 in downlink may be to take PDCP Packet Data Units, PDUs, from a PDCP PDU buffer and build MAC PDUs that are sent to L1. This may be triggered by a transmit order from User Plane Control, UPC, and is normally part of a latency-critical processing path. For example, less than 0.5 ms may be allowed for the synchronous L2 processing in downlink. In split scenarios this includes transport latency as well as processing latency. In downlink the synchronous part of L2 may also handle multiplexing of logical channels, HARQ retransmissions, MAC control elements, MAC procedures such as random access, RLC PDU buffering and retransmissions, and RLC status messages. The PDCP PDU buffers may typically be shared between the asynchronous part of L2 and the synchronous part of L2. If this is not possible, for example, if the asynchronous part of L2 is placed at a different site, a flow control mechanism may be added to transfer PDCP PDUs from the asynchronous part of L2 to the synchronous part of L2. Uplink: A task of the synchronous part of L2 in uplink may be to deconstruct MAC PDUs received from L1 into PDCP PDUs that are delivered to the asynchronous part of L2. In uplink, the synchronous part of L2 may also handle MAC control elements, MAC procedures such as random access, demultiplexing of logical channels, RLC PDU buffering, reordering and retransmissions, and RLC status messages. In uplink the synchronous part of L2 may typically not be part of a latency critical processing path, but may have a direct impact on the end-to-end packet latency.

User Plane Control (not shown explicitly in FIG. 10) comprises fast Radio Resource Management, RRM, functions that may occur on a per-sub-frame basis. This may e.g. include air-interface resource scheduling, link adaptation (transport format selection), and power control. UPC may use input from L1 and/or the synchronous part of L2, and generate messages to L1 and/or the synchronous part of L2. The input may include buffer status reports, measurement reports, Channel Quality Indicator, CQI, reports, and HARQ feedback. The messages may be control information sent to the UEs, as well as uplink and downlink scheduling commands sent to L1 and the synchronous part of L2. UPC may thus handle scheduling and optimization problems, involving many UEs and shared resources such as spectrum, power, and hardware.

As indicated, the asynchronous part of L2 normally includes the PDCP layer, whose primary tasks may be ciphering, header compression, and integrity protection for signaling. It may also support lossless handover. In downlink, the asynchronous part of L2 may maintain a PDCP PDU buffer, which is often shared with the synchronous part of L2. In cases where this is not possible, such as if L2 is split between different sites, a flow-control mechanism may be needed to transfer PDUs between the asynchronous part of L2 and the synchronous part of L2.

The L3 sub-layer RRC normally includes the control of one or more of the following functions: connection handling, such as setup and release of connections, mobility handling, such as handover or redirection release, UE Measurement Control, Load Management, such as Inter-Frequency Load Balancing and Offload, and Enhanced Multimedia Broadcast and Multicast Services, eMBMS. By way of example, services and functions of the RRC sub-layer of L3 may also include broadcast of System Information, key management, establishment, configuration, maintenance and release of point-to-point Radio Bearers.

NAS, which may also be regarded as part of L3, typically form the highest stratum of the control plane between the UE and the Mobility Management Entity, MME. NAS supports the mobility of the UE and the session management procedures to establish and maintain IP connectivity between the UE and a corresponding gateway.

Figure 11:
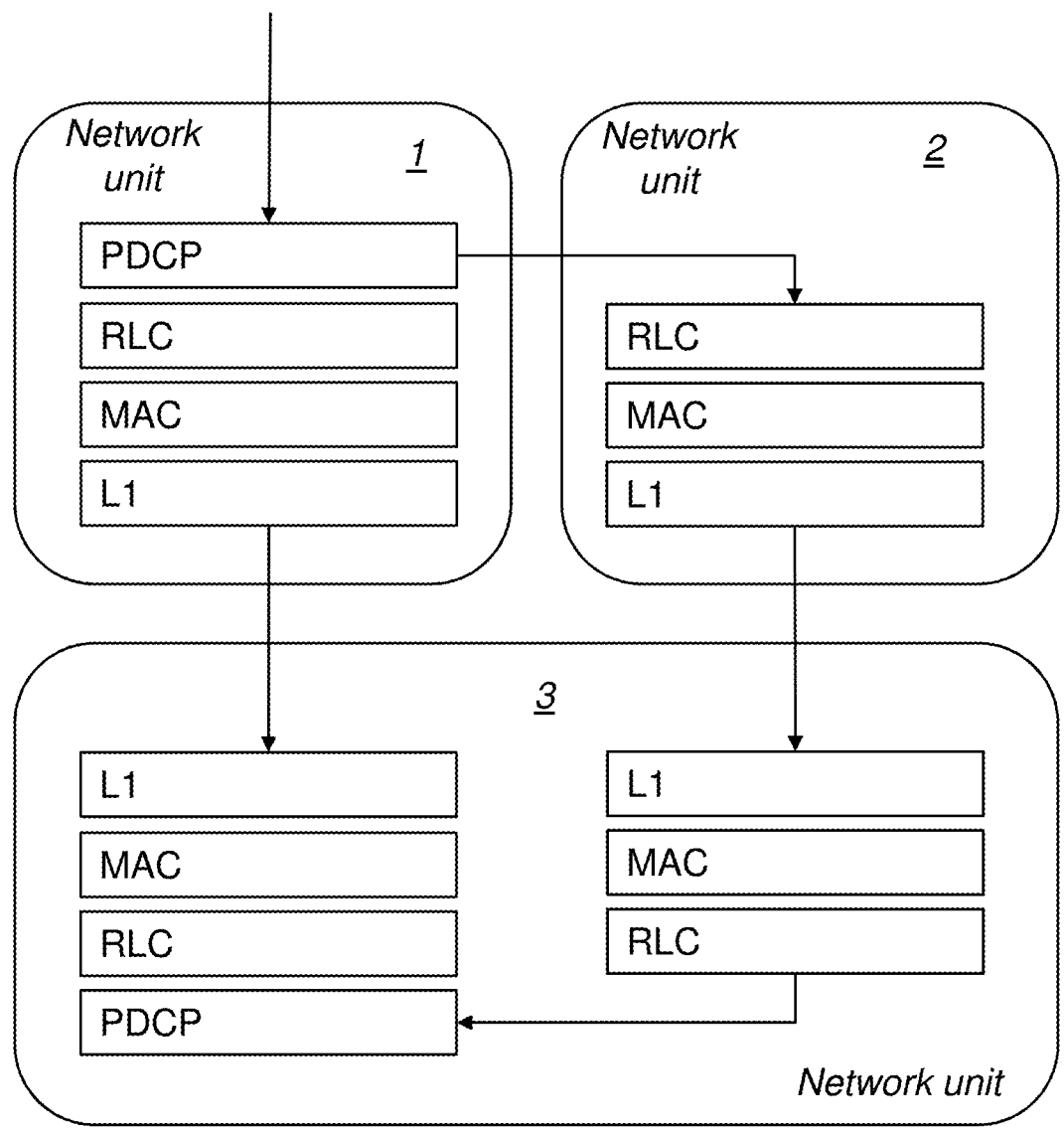
FIG. 11 is a schematic diagram illustrating a particular example of network units involved in multi/dual connectivity and packet multiplication/duplication, using the protocol stack described in connection with FIG. 10.

FIG. 11 is a schematic diagram illustrating a particular example of network units involved in multi/dual connectivity and packet multiplication/duplication, using the protocol stack described in connection with FIG. 10.

In this example, a first network unit 1 implements L1, MAC, RLC, as well as PDCP, and a second network unit 2 implements L1, MAC and RLC, and a third network unit 3 implements L1, MAC, RLC, PDCP for the first connection in relation to the first network unit 1 and L1, MAC, RLC for the second connection in relation to the second network unit 2.

Figure 12:
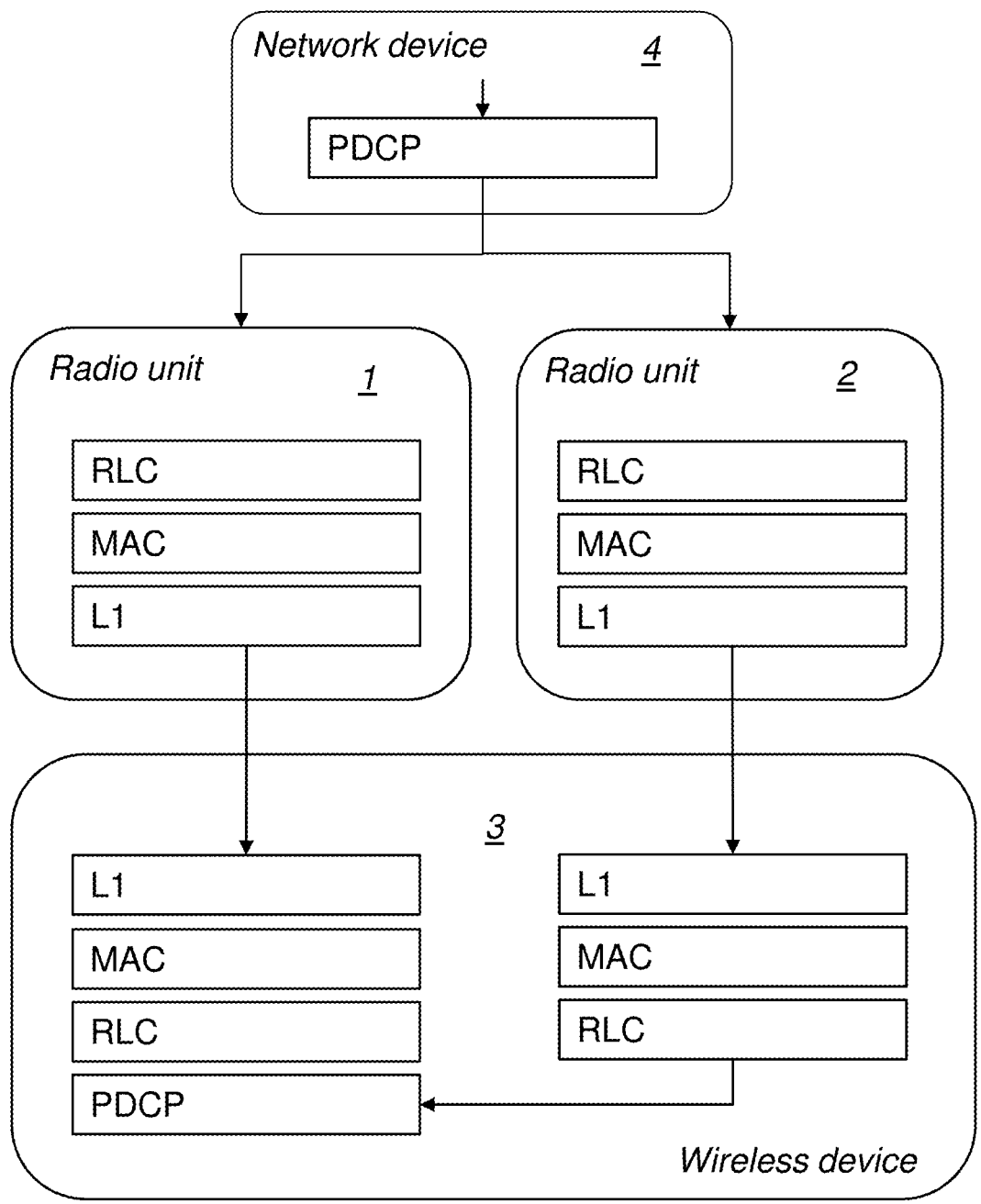
FIG. 12 is a schematic diagram illustrating another particular example of network units involved in multi/dual connectivity and packet multiplication/duplication, using the protocol stack described in connection with FIG. 10.

FIG. 12 is a schematic diagram illustrating another particular example of network units involved in multi/dual connectivity and packet multiplication/duplication, using the protocol stack described in connection with FIG. 10.

In this example, the first and second network units are illustrated as radio units, and the third network unit as a wireless device. Both the first radio unit 1 and the second radio unit implements L1, MAC, RLC, while a central network device 4 implements PDCP, e.g. to coordinate duplication of PDCP Packet Data Units, PDCP PDUs, and distribute them among the multiple connections to the wireless device 3.

For a better understanding, the proposed technology will now be described with reference to particular, non-limiting examples with reference to an asymmetric implementation using a Master eNB, MeNB, and a Secondary eNB, SeNB, for dual connectivity and packet duplication.

Figure 13A:
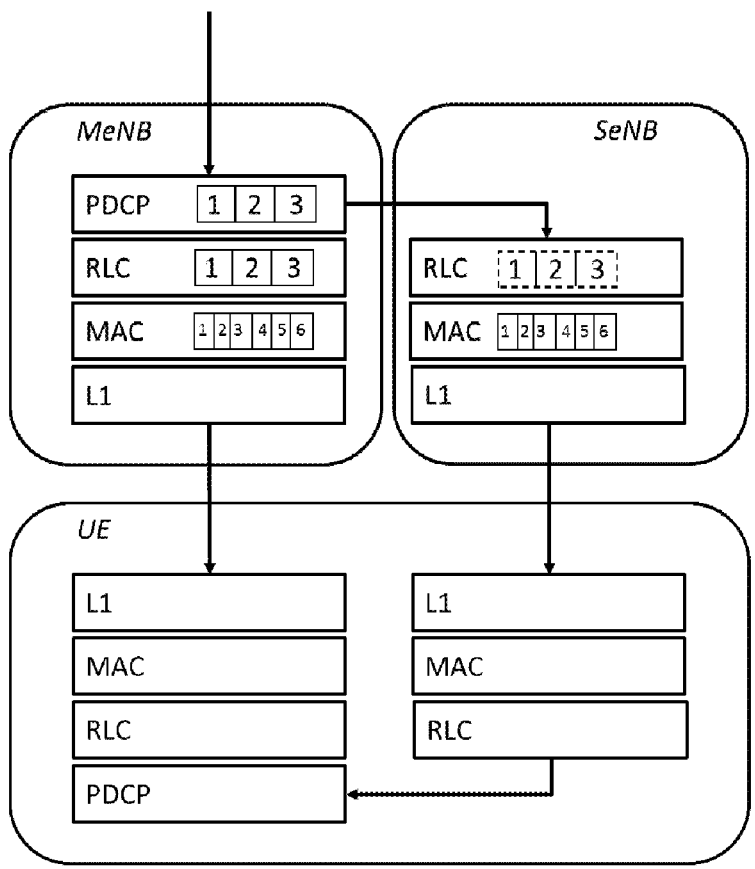
FIG. 13A is a schematic diagram illustrating an example of dual connectivity according to 3GPP split bearer type.

FIG. 13A shows dual connectivity according to 3GPP [R2-165330] split bearer type. It is assumed that duplication of packets using dual connectivity is enabled. In this example, packets are duplicated and sent to SeNB, over X2. The PDCP SDUs are then packetized by RLC and MAC. In this case one MAC PDU carries half a PDCP packet. Packets are sent to UE using a MeNB and a SeNB.

Figure 13B:
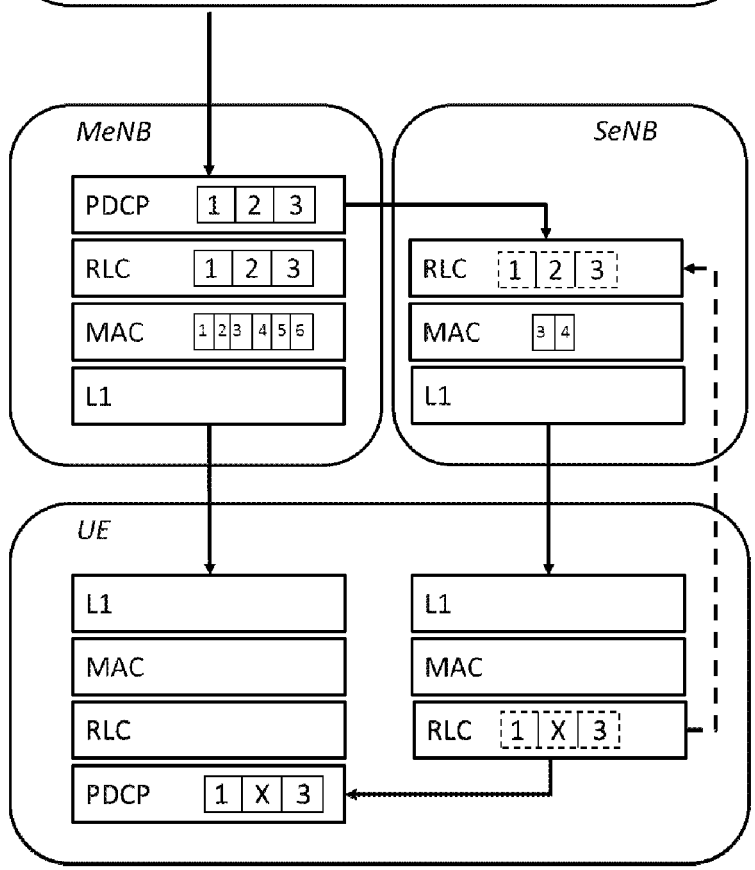
FIG. 13B is a schematic diagram illustrating an example of a UE that receives RLC packets from a SeNB.

FIG. 13B shows that the UE receives from the SeNB RLC packets 1 and 3. Number 2 is still being (re-)transmitted. The UE has thus received PDCP packets 1 and 3. The UE RLC entity informs the SeNB that it has received packets 1 and 3.

Figure 13C:
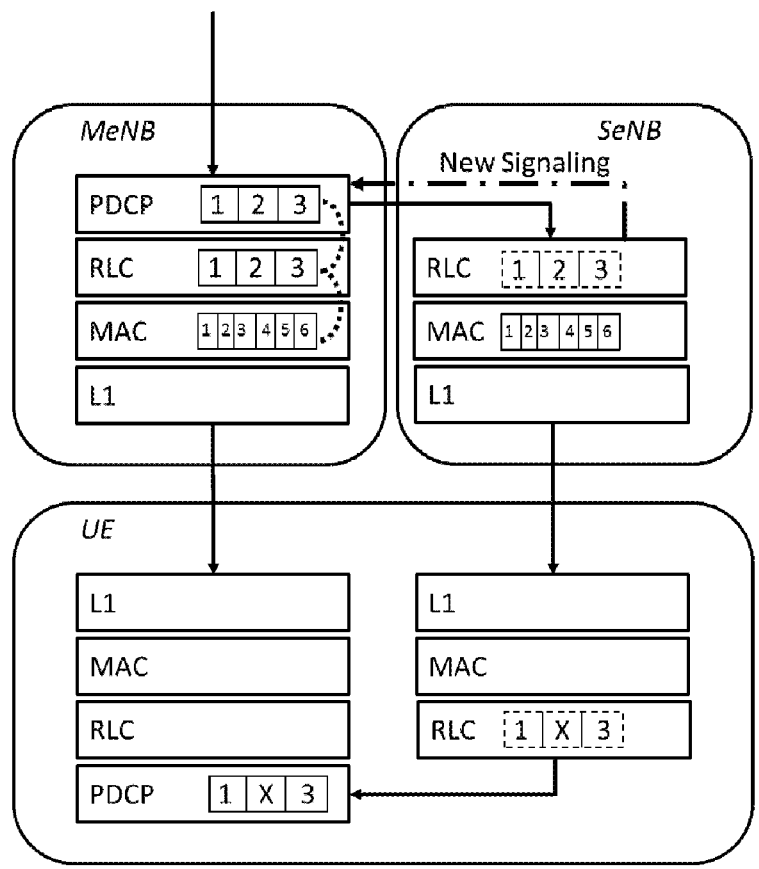
FIG. 13C is a schematic diagram illustrating an example of providing acknowledgements, here exemplified by X2 signaling.

FIG. 13C shows a first way of providing the acknowledgements, here exemplified by X2 signaling. The SeNB uses NEW SIGNALING message(s) towards the MeNB informing the MeNB that it has received PDCP packets 1 and 3. The MeNB transfers this information down to the RLC layer and MAC layer to stop transmission of PDUs that contains only whole or parts of PDCP packets 1 and 3. If a RLC or MAC data unit holds information from any other PDCP packet it must not stop the transmission of those data units. The RLC and MAC stops transmission of the corresponding data units of PDCP packets 1 and 3, and removes those from their buffer(s).

Figure 13D:
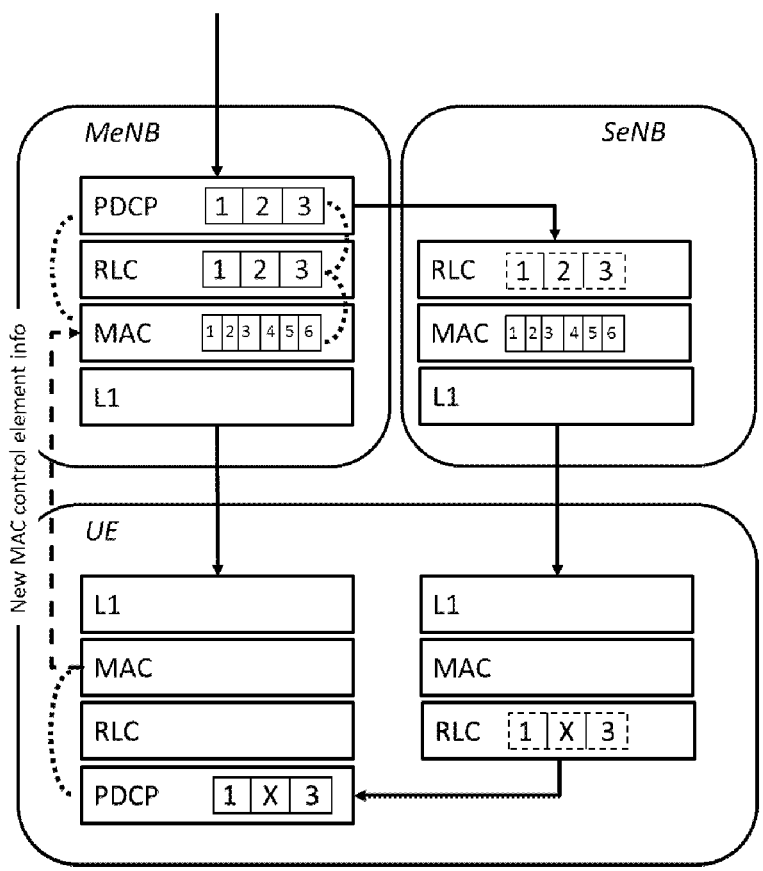
FIG. 13D is a schematic diagram illustrating another example of providing acknowledgements, here exemplified by MAC control element signaling of the second connection's uplink.

FIG. 13D shows a second way of providing the acknowledgements, here exemplified by MAC control element signaling of the second connection's uplink. The UE (PDCP entity) informs the MeNB that it has received packets 1 and 3 via a New MAC control element. In a particular example, the MeNB MAC entity receives the MAC control element and informs the PDCP entity and the MeNB transfers this information to the RLC and MAC layer to stop transmission of PDUs that contains only whole or parts of PDCP packets 1 and 3. If a RLC or MAC data unit holds information from any other PDCP packet it must not stop the transmission of those data units. The RLC and MAC stops transmission of the corresponding data units of PDCP packets 1 and 3, and removes those from their buffers.

Figure 13E:
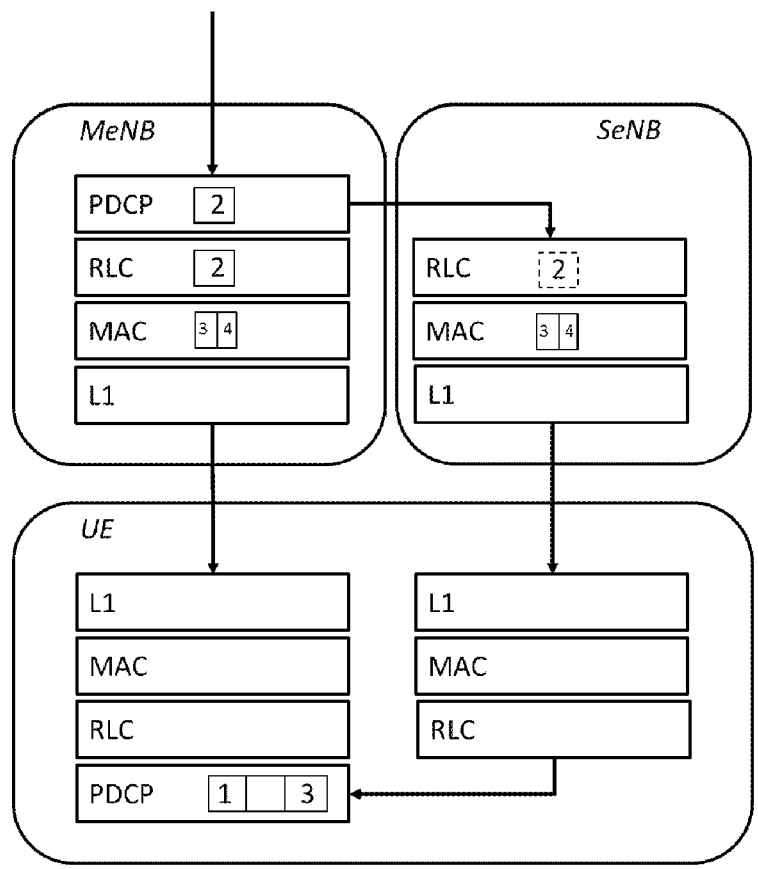
FIG. 13E is a schematic diagram illustrating an example of the status of the buffers, when the PDCP packets 1 and 3 have been received and thus removed from the re-transmission buffers of the network.
Figure 14A:
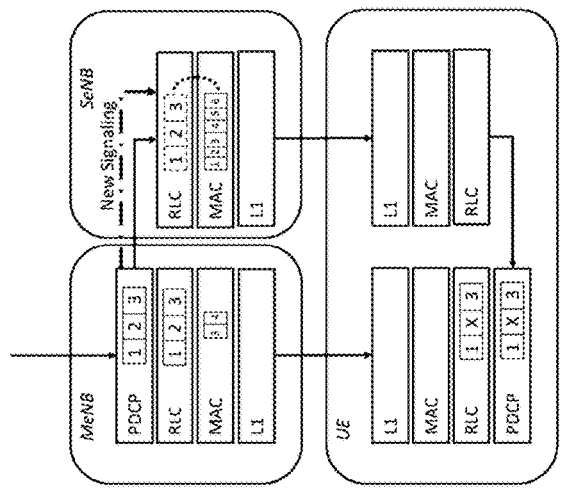
FIGS. 14A-D are schematic diagrams illustrating, similar to the procedure and/or actions illustrated in FIGS. 13A-D, a corresponding procedure and/or actions if it is the MeNB connection that has a successful transmission.
Figure 14C:
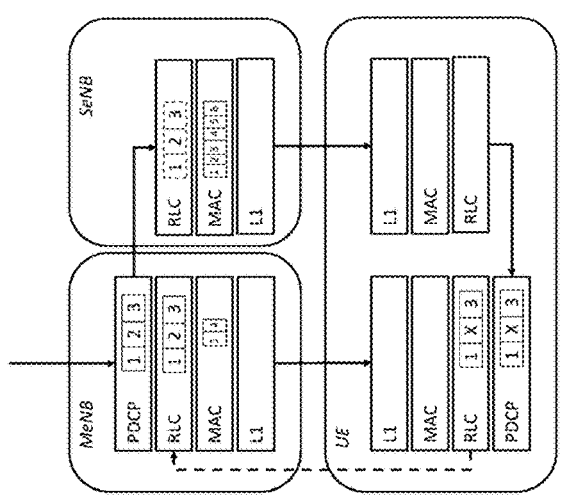
Figure 14B:
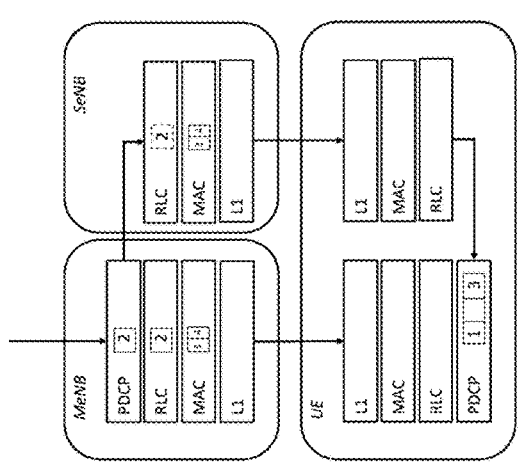
Figure 14D:
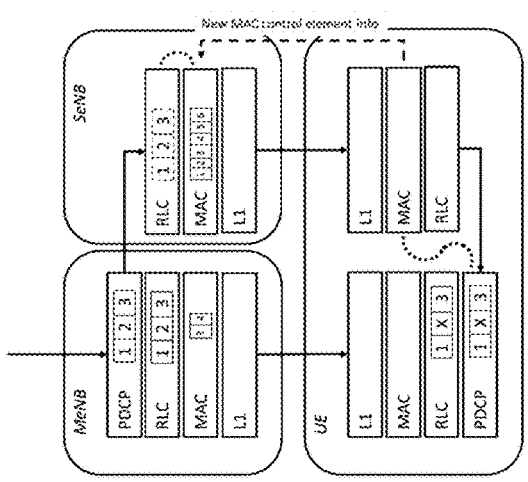

FIG. 13E shows the status of the buffers, the PDCP packets 1 and 3 are received and thus removed from the re-transmission buffers of the network.

Similar to the procedure and/or actions illustrated in FIGS. 13A-D, a corresponding procedure and/or actions if it is the MeNB connection that has a successful transmission is/are shown in the example of FIGS. 14A-D.

By way of example, a mapping between PDCP, RLC, and MAC packets could be maintained in order to be able to remove the corresponding acknowledged packets received via the first connection also at the second connection. For example, this can be done by keeping a mapping between the PDCP sequence number and the RLC and MAC/HARQ sequence numbers, or more specifically a mapping between PDCP/RLC sequence numbers and MAC PDUs.

However, to simplify the implementation another enhancement may be to reduce the possible transport block sizes to be used at the two connections. In its simplest form this solution enhancement would be to use the same transport block size on both connections allowing for simple and known mapping between transport blocks up to the PDCP packets. Another incentive for doing the transport block size is that duplication is likely to be used in difficult coverage situations or extreme reliability, hence, getting some throughput is better than a high throughput.

Figure 15:
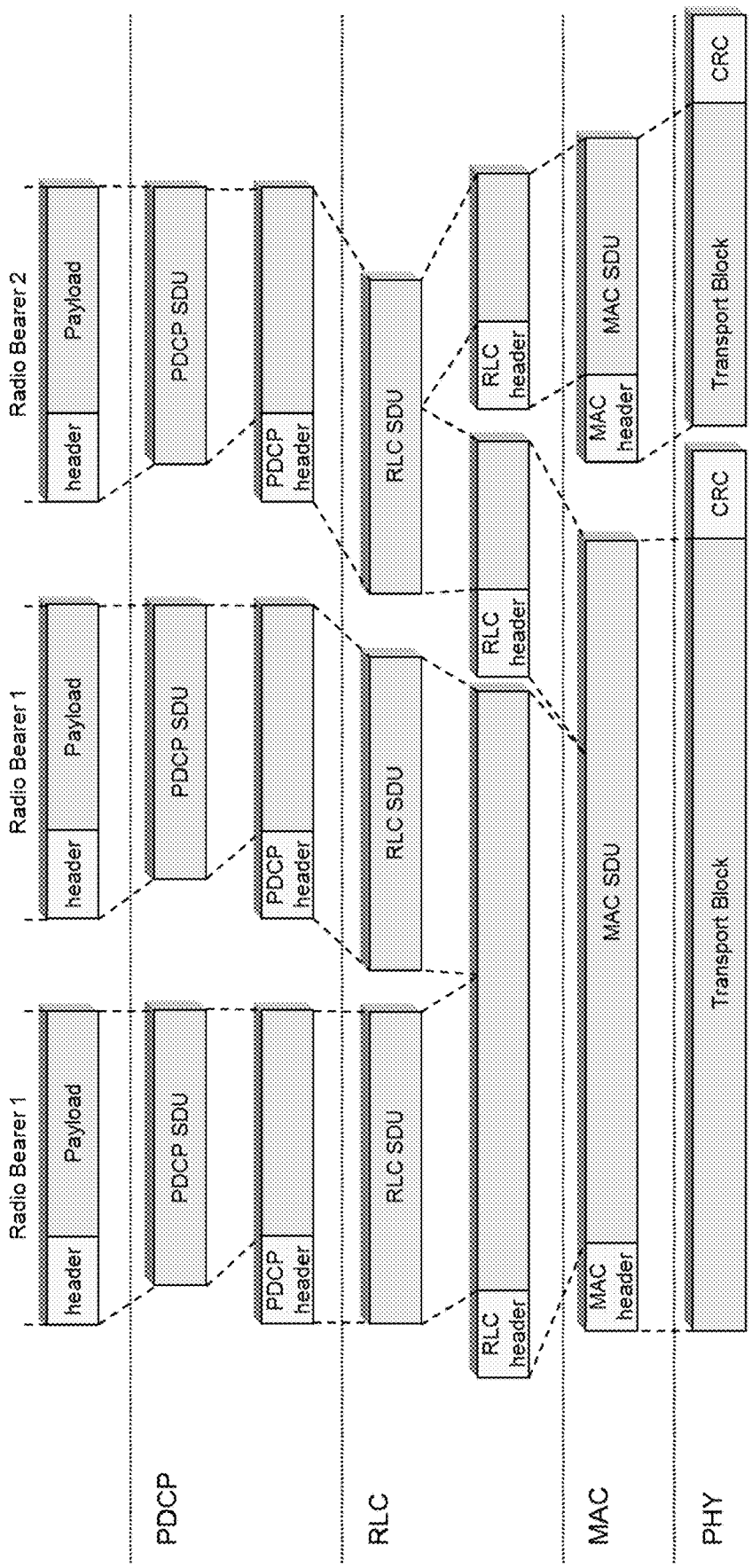
FIG. 15 is a schematic diagram illustrating an example of normal packet sizes mapping between the layers of LTE, e.g. a SDU/PDU mapping of LTE.

FIG. 15 is a schematic diagram illustrating an example of normal packet (PDU and SDU) sizes mapping between the layers of LTE, e.g. a SDU/PDU mapping of LTE. A Similar mapping is applicable to NR.

Figures 16A, 16B:
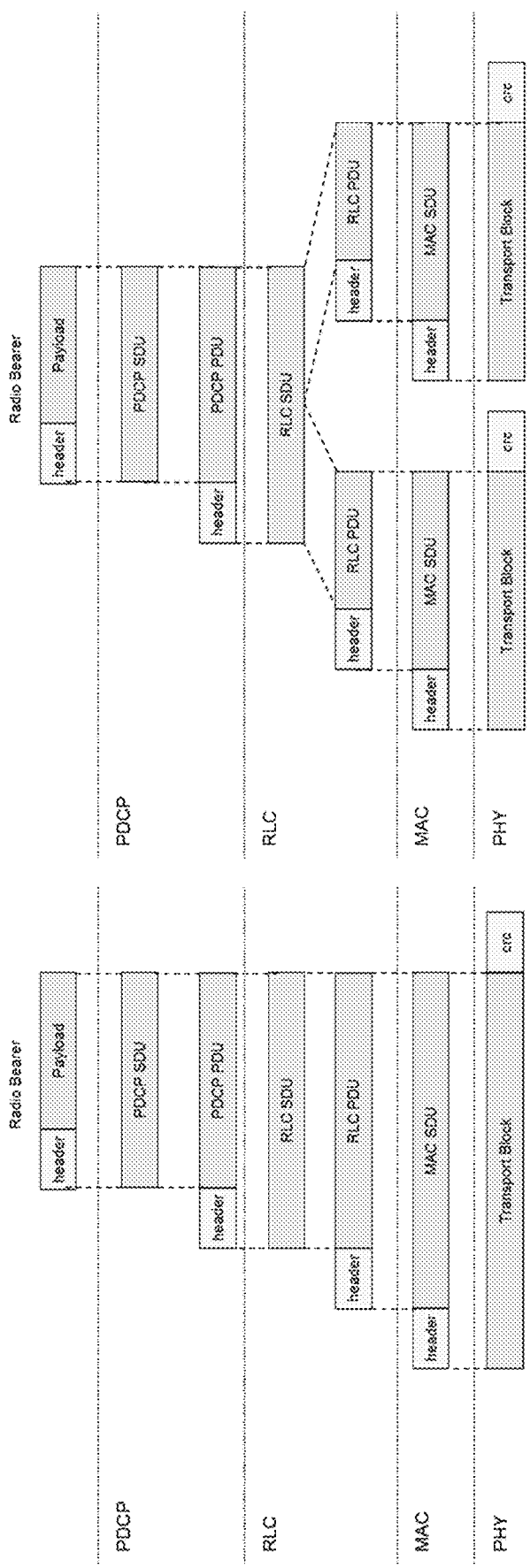
FIGS. 16A-B are schematic diagrams illustrating two examples when the transport block size is limited, one-2-one mapping (FIG. 16A) and one-2-two mapping (FIG. 16B).

FIGS. 16A-B are schematic diagrams illustrating two examples when the transport block size is limited, one-2-one mapping (FIG. 16A) and one-2-two mapping (FIG. 16B). Hence, two transport block sizes are allowed.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a sixth aspect, there is provided a network unit configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
   wherein the network unit is configured for operation as the first network unit, and the network unit is configured to receive information from the third network unit indicating packets received by the third network unit from the first network unit over the first connection; and
   wherein the network unit is configured to transmit an indication to the second network unit enabling removal of packets from one or more transmission buffers of the second network unit corresponding to the indicated packets received by the third network unit from the first network unit over the first connection.

In other words, there is provided a network unit configured for operation in a wireless system for packet multiplication/duplication.

By way of example, the network unit may be a radio network unit such as a base station and/or a radio unit of a distributed base station.

According to a seventh aspect, there is provided a network unit configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
   wherein the network unit is configured for operation as the second network unit and the network unit is configured to receive an indication enabling removal of packets from one or more transmission buffers of the second network unit corresponding to packets received by the third network unit from the first network unit over the first connection; and
   wherein the network unit is configured to remove the indicated packets from the transmission buffer(s).

In other words, there is provided a network unit configured for operation in a wireless system for packet multiplication/duplication.

By way of example, the network unit may be a radio network unit such as a base station and/or a radio unit of a distributed base station.

According to an eighth aspect, there is provided a network unit configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
   wherein the network unit is configured for operation as the third network unit and the network unit is configured to receive packets from the first network unit over the first connection; and
   wherein the network unit is configured to transmit an indication to the second network unit enabling removal of packets from one or more transmission buffers of the second network corresponding to the packets received from the first network unit over the first connection.

By way of example, the network unit may be a wireless communication device such as a User Equipment, UE, or equivalent device.

According to a ninth aspect, there is provided a network device configured for operation in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
> wherein the network device is configured to receive information indicating which packets are received by the third network unit from the first network unit over the first connection; and
> wherein the network device is configured to transmit an indication to the second network unit enabling removal of packets from one or more transmission buffers of the second network unit corresponding to the indicated packets received by the third network unit from the first network unit over the first connection.

By way of example, the network device may be a computer-based network device, e.g. implemented in a network node or as a cloud-based network device for arrangement in connection with the wireless communication system.

Figure 17:
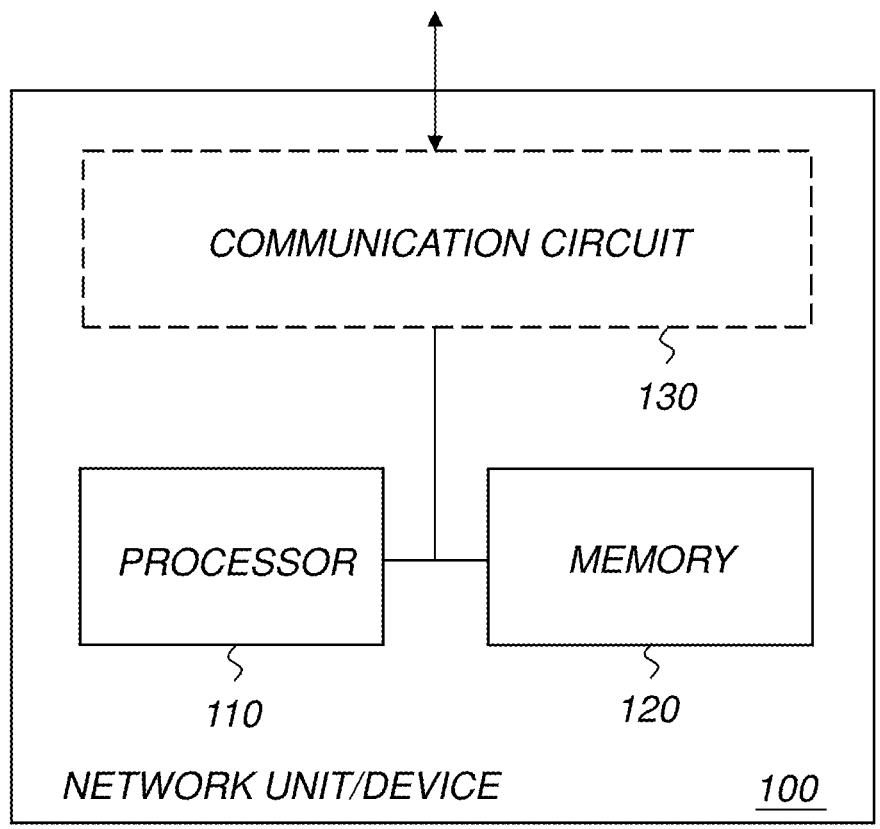
FIG. 17 is a schematic block diagram illustrating an example of a network unit/device, based on a processor-memory implementation according to an embodiment.

FIG. 17 is a schematic block diagram illustrating an example of a network unit/device 100, based on a processor-memory implementation according to an embodiment. In this particular example, the network unit/device 100 comprises a processor 110 and a memory 120, the memory 120 comprising instructions executable by the processor 110, whereby the processor is operative to perform the functions described herein.

Optionally, the network unit/device 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130; 230 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 18:
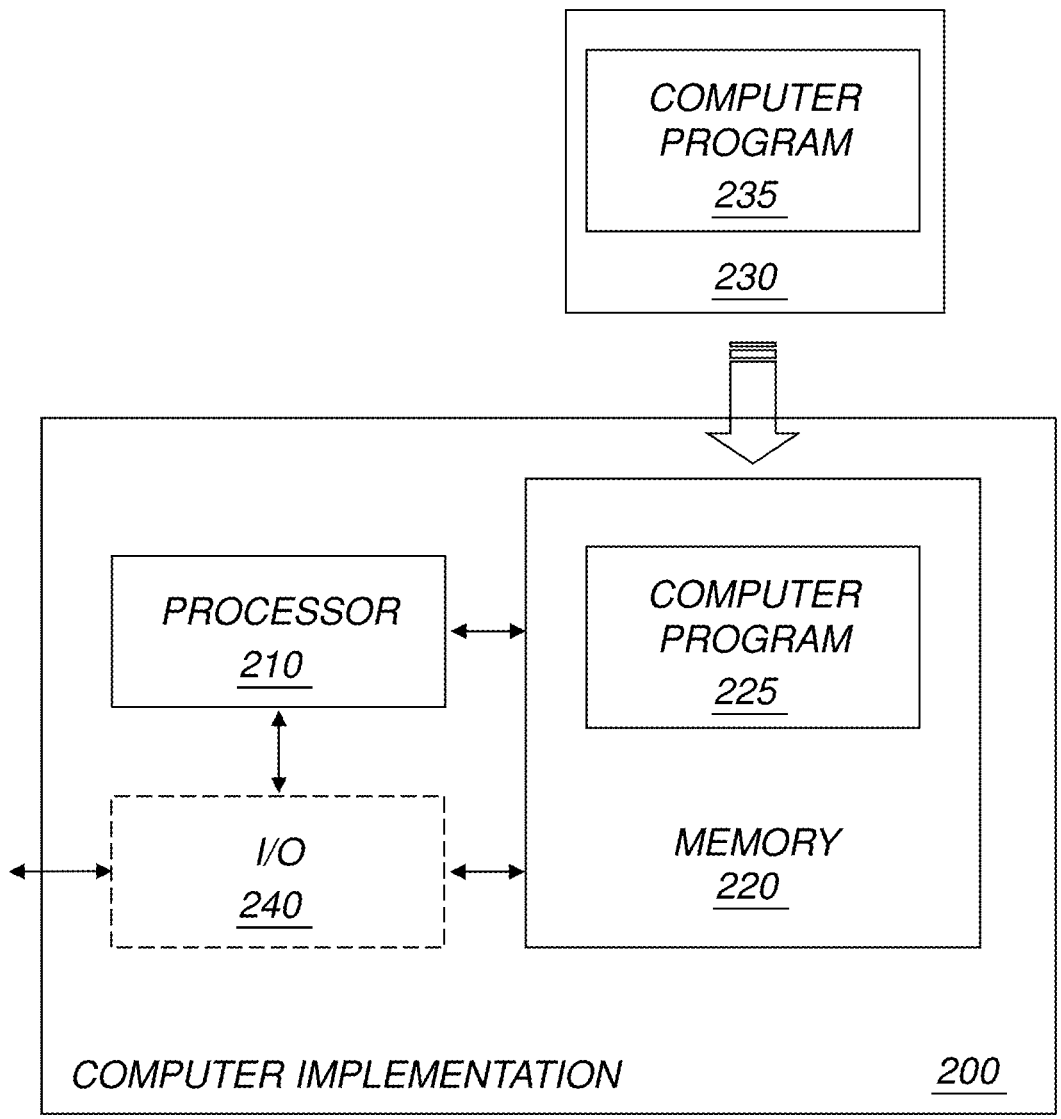
FIG. 18 is a schematic diagram illustrating an example of a computer-implementation according to an embodiment.

FIG. 18 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor 210, cause the processor(s) 210 to perform the actions described herein.

According to a tenth aspect, there is provided a computer program for operating, when executed by a processor, at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
> wherein the computer program comprises instructions, which when executed by the processor, cause the processor to:
> read information received from the third network unit indicating packets received by the third network unit from the first network unit over the first connection; and
> prepare an indication, for transmission to the second network unit, enabling removal of packets from one or more transmission buffers of the second network unit corresponding to the indicated packets received by the third network unit from the first network unit over the first connection.

In other words, the computer program of the tenth aspect corresponds to the method of the first aspect, as seen from the perspective of a processor.

According to an eleventh aspect, there is provided a computer program for operating, when executed by a processor, at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection,
> wherein the computer program comprises instructions, which when executed by the processor, cause the processor to:
> receive an indication enabling removal of packets from one or more transmission buffers of the second network unit corresponding to packets received by the third network unit from the first network unit over the first connection; and
> removing the indicated packets from the transmission buffer(s) of the second network unit.

In other words, the computer program of the eleventh aspect corresponds to the method of the second aspect, as seen from the perspective of a processor.

According to a twelfth aspect, there is provided a computer program for operating, when executed by a processor, at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the computer program comprises instructions, which when executed by the processor, cause the processor to:

be notified of packets received from the first network unit over the first connection; and prepare an indication, for transmission to the second network unit, enabling removal of packets from one or more transmission buffers of the second network corresponding to the packets received from the first network unit over the first connection.

In other words, the computer program of the twelfth aspect corresponds to the method of the third aspect, as seen from the perspective of a processor.

According to a thirteenth aspect, there is provided a computer program for operating, when executed by a processor, a network device in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection, wherein the computer program comprises instructions, which when executed by the processor, cause the processor to:

receive information indicating packets that have been received by the third network unit from the first network unit over the first connection; and prepare an indication, for transmission to the second network unit, enabling removal of packets from one or more transmission buffers of the second network unit corresponding to the indicated packets received by the third network unit from the first network unit over the first connection.

In other words, the computer program of the thirteenth aspect corresponds to the method of the fourth aspect, as seen from the perspective of a processor.

According to a fourteenth aspect, there is provided a computer program product comprising a computer-readable medium in which a computer program of any of the above aspects is stored.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 19:
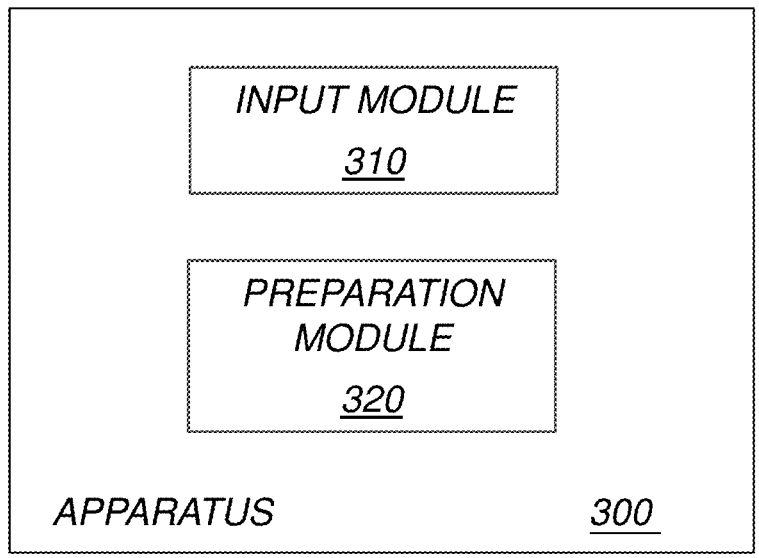
FIG. 19 is a schematic diagram illustrating an example of an apparatus for operating at least one network unit in a wireless communication system.

FIG. 19 is a schematic diagram illustrating an example of an apparatus for operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection. The apparatus 300 comprises:

an input module 310 for reading information received from the third network unit indicating packets received by the third network unit from the first network unit over the first connection; and a preparation module 320 for preparing an indication, for transmission to the second network unit, enabling removal of packets from one or more transmission buffers of the second network unit corresponding to the indicated packets received by the third network unit from the first network unit over the first connection.

Figure 20:
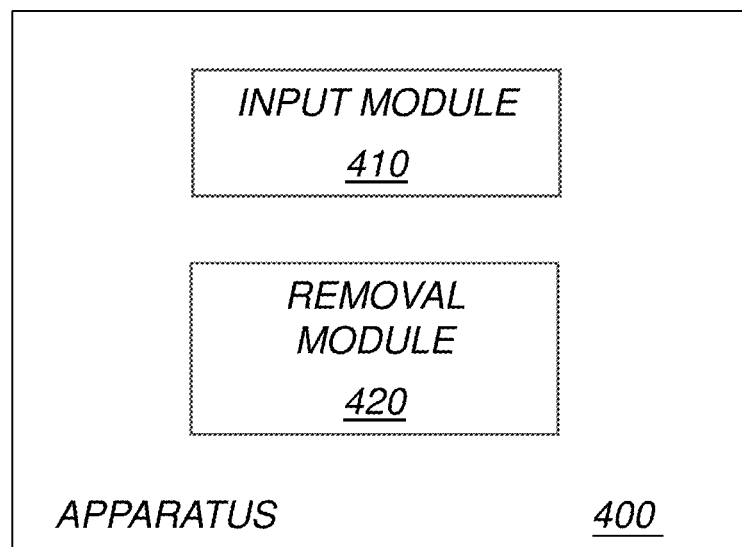
FIG. 20 is a schematic diagram illustrating an example of an apparatus for operating at least one network unit in a wireless communication system.

FIG. 20 is a schematic diagram illustrating an example of an apparatus for operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection. The apparatus 400 comprises:

an input module 410 for receiving an indication enabling removal of packets from one or more transmission buffers of the second network unit corresponding to packets received by the third network unit from the first network unit over the first connection; and a removal module 420 for removing of the indicated packets from the transmission buffer(s) of the second network unit.

Figure 21:
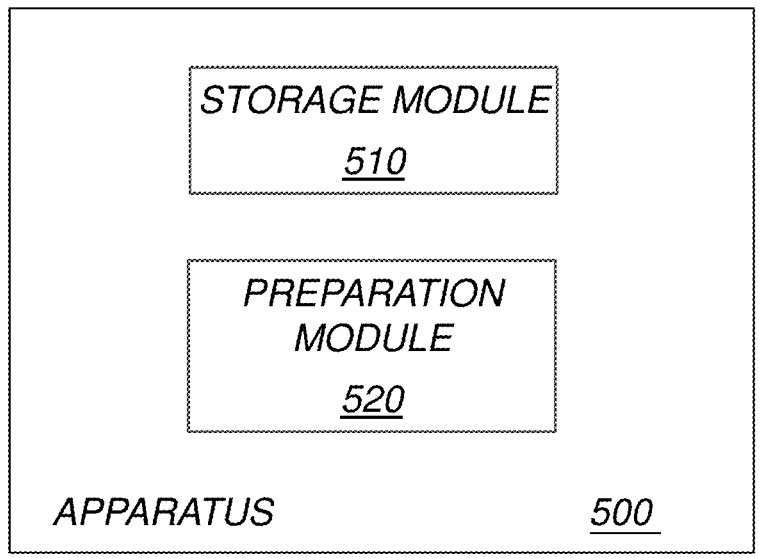
FIG. 21 is a schematic diagram illustrating an example of an apparatus for operating at least one network unit in a wireless communication system.

FIG. 21 is a schematic diagram illustrating an example of an apparatus for operating at least one network unit in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection. The apparatus 500 comprises:

a storage module 510 for storing a notification of packets received from the first network unit over the first connection; and a preparation module 520 for preparing an indication, for transmission to the second network unit, enabling removal of packets from one or more transmission buffers of the second network corresponding to the packets received from the first network unit over the first connection.

Figure 22:
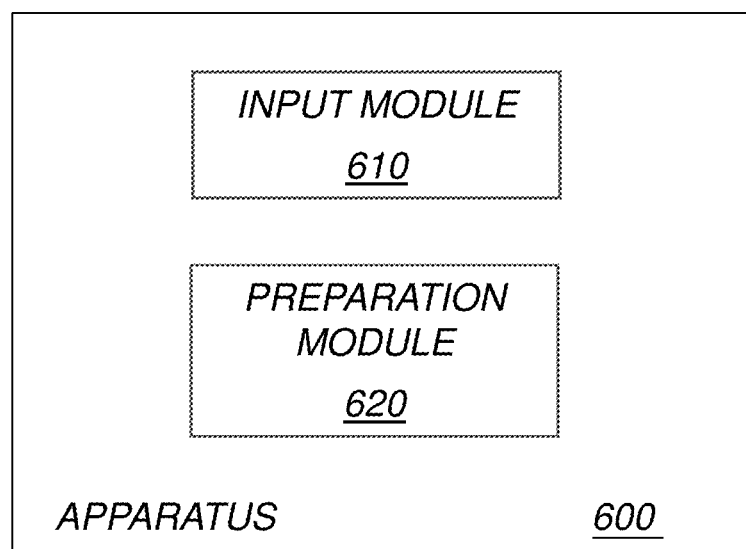
FIG. 22 is a schematic diagram illustrating an example of an apparatus for operating a network device in a wireless communication system.

FIG. 22 is a schematic diagram illustrating an example of an apparatus for operating a network device in a wireless communication system, wherein the wireless communication system comprises a first network unit and a second network unit that are both connected to a third network unit using a first connection, between the first network unit and the third network unit, and using a second connection, between the second network unit and the third network unit, wherein packets comprising the same information are transmitted over both the first connection and the second connection. The apparatus 600 comprises:

- an input module 610 for receiving information indicating packets that have been received by the third network unit from the first network unit over the first connection; and
- a preparation module 620 for preparing an indication, for transmission to the second network unit, enabling removal of packets from one or more transmission buffers of the second network unit corresponding to the indicated packets received by the third network unit from the first network unit over the first connection.

Alternatively it is possible to realize the module(s) in FIGS. 19-22 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

R2-163399 Summary of email discussion [93bis #23][NR] Deployment scenarios

R2-164027, Tight integration of NR and LTE—User Plane design

R2-165330, Dual Connectivity based link switch between LTE and NR

The invention claimed is:

1. A wireless communication system configured to use multi-connectivity to extend coverage with respect to a wireless device, based on using first and second wireless connections for duplicative packet transmissions to the wireless device, the system comprising:
   a first radio network node comprising communication circuitry operative to provide the first wireless connection, and a transmit buffer operative to buffer packets for transmission to the wireless device via the first wireless connection;
   a second radio network node comprising communication circuitry operative to provide the second wireless connection, and a transmit buffer operative to buffer the same packets for transmission to the wireless device via the second wireless connection; and
   wherein the first and second radio network nodes are configured to communicate with one another, to avoid performing duplicative transmissions on one of the wireless connections for packets that have been transmitted successfully to the wireless device on the other wireless connection;
   wherein, for comparable radio conditions relative to the wireless device, one of the wireless connections provides a higher throughput than the other wireless connection;
   wherein the radio network node associated with the faster connection is configured to send indications to the radio network node associated with the slower connection, the indications indicating successful deliveries of packets to the wireless device via the faster connection; and
   wherein the radio network node associated with the slower connection is configured to perform duplicative transmissions for packets that have not already been successfully delivered via the faster connection, and not perform duplicative transmissions for packets that have already been successfully delivered via the faster connection, and, in conjunction with not performing the duplicative transmissions, remove the corresponding packets from a transmission buffer of the radio network node, to address the slower connection falling behind the faster connection.

2. The wireless communication system of claim 1, wherein the faster connection is a Fifth Generation (5G) New Radio (NR) connection, and the slower connection is a Long Term Evolution (LTE) connection.

3. The wireless communication system of claim 1, wherein the first and second network nodes are integrated or co-located.

4. The wireless communication system of claim 1, wherein the first and second wireless connections respectively correspond to first and second Radio Access Technologies (RATs).

5. The wireless communication system of claim 1, wherein the packets for duplicative transmission over the first and second wireless connections are user-plane packets.

6. A method of using multi-connectivity to extend coverage with respect to a wireless device, based on using first and second wireless connections for duplicative packet transmissions to the wireless device, the method comprising:

buffering duplicative packets at first and second radio network nodes, for respective transmissions to the wireless device over the first and second wireless connections; and communicating between the first and second radio network node, to avoid performing duplicative transmissions on one of the wireless connections for packets that have been transmitted successfully to the wireless device on the other wireless connection;

wherein, for comparable radio conditions relative to the wireless device, one of the wireless connections provides a higher throughput than the other wireless connection;

wherein the radio network node associated with the faster connection is configured to send indications to the radio network node associated with the slower connection, the indications indicating successful deliveries of packets to the wireless device via the faster connection; and wherein the radio network node associated with the slower connection is configured to perform duplicative transmissions for packets that have not already been successfully delivered via the faster connection, and not perform duplicative transmissions for packets that have already been successfully delivered via the faster connection, and, in conjunction with not performing the duplicative transmissions, remove the corresponding packets from a transmission buffer of the radio network node, to address the slower connection falling behind the faster connection.

7. The method of claim 6, wherein the faster connection is a Fifth Generation (5G) New Radio (NR) connection, and the slower connection is a Long Term Evolution (LTE) connection.

8. The method of claim 6, wherein the first and second network nodes are integrated or co-located.

9. The method of claim 6, wherein the first and second wireless connections respectively correspond to first and second Radio Access Technologies (RATs).

10. The method of claim 6, wherein the packets for duplicative transmission over the first and second wireless connections are user-plane packets.

* * * * *